(12) United States Patent
Kalantari et al.

(10) Patent No.: US 12,541,019 B2
(45) Date of Patent: Feb. 3, 2026

(54) CO-EXISTENCE OPERATIONS INVOLVING A RADAR-ENABLED USER EQUIPMENT AND RADIO NETWORK NODES

(71) Applicant: Telefonaktiebolaget LM Ericsson (publ), Stockholm (SE)

(72) Inventors: Ashkan Kalantari, Malmö (SE); Fredrik Dahlgren, Lund (SE); Andres Reial, Höllviken (SE); Gang Zou, Lund (SE); Henrik Sjöland, Lund (SE); Magnus Sandgren, Staffanstorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 435 days.

(21) Appl. No.: 18/012,405

(22) PCT Filed: Jul. 10, 2020

(86) PCT No.: PCT/EP2020/069495
§ 371 (c)(1),
(2) Date: Dec. 22, 2022

(87) PCT Pub. No.: WO2022/008065
PCT Pub. Date: Jan. 13, 2022

(65) Prior Publication Data
US 2023/0251370 A1 Aug. 10, 2023

(51) Int. Cl.
*G01S 13/76* (2006.01)
*G01S 7/00* (2006.01)
*G01S 7/02* (2006.01)

(52) U.S. Cl.
CPC .......... *G01S 13/765* (2013.01); *G01S 7/006* (2013.01); *G01S 7/023* (2013.01)

(58) Field of Classification Search
CPC ........ G01S 13/765; G01S 13/42; G01S 7/006; G01S 7/023; G01S 13/878; G01S 7/021;
(Continued)

(56) References Cited

U.S. PATENT DOCUMENTS

| 4,435,707 A | 3/1984 | Clark |
| 4,973,964 A | 11/1990 | Schuster |

(Continued)

FOREIGN PATENT DOCUMENTS

| EP | 0548309 A1 | 6/1993 |
| GB | 2570389 A | 7/2019 |

(Continued)

OTHER PUBLICATIONS

Afzal, et al., "Real time rainfall estimation using microwave signals of cellular 1 communication networks: a Case Study of Faisalabad, Pakistan", Hydrol. Earth Syst. Sci. Discuss., https://doi.org/10.5194/hess-2017-740, Manuscript under review for journal Hydrol. Earth Syst. Sci., Jan. 15, 2018.

(Continued)

*Primary Examiner* — Vladimir Magloire
*Assistant Examiner* — Peter Davon Doze
(74) *Attorney, Agent, or Firm* — Murphy, Bilak & Homiller, PLLC

(57) ABSTRACT

A radar-enabled wireless communication device (12) is configured to communicate with a wireless communication network (10) and performs radar transmissions using a same or overlapping millimeter wave (mmW) frequency range, determine whether there are any neighboring wireless communication devices (32) that are vulnerable to interference from the radar transmissions and, if so, adapt radar transmissions in the affected radar beam directions or transmit assistance information enabling the vulnerable devices (32) to mitigate or avoid the interference. In a particular example, the wireless communication device (12) performs radar transmissions during a Downlink (DL) phase of the wireless communication network (10), such that the vulnerability determinations are with respect to DL interference at the neighboring wireless communication devices (32). Vulner- (Continued)

ability determinations may be performed with or without support of the wireless communication network (10) and may be updated responsive to detecting changed conditions.

21 Claims, 10 Drawing Sheets

(58) Field of Classification Search
CPC .............. G01S 7/0235; H04W 72/541; H04W 74/0816; H04W 72/12; H04W 72/51; H04W 74/002; H04B 17/382; H04K 3/822; H04L 5/0048; H04L 43/062
See application file for complete search history.

(56) References Cited

U.S. PATENT DOCUMENTS

| | | | |
|---|---|---|---|
| 6,429,804 | B1 | 8/2002 | Kishida et al. |
| 6,847,690 | B1 | 1/2005 | Sahlin et al. |
| 9,055,474 | B2 | 6/2015 | Heo et al. |
| 9,091,759 | B1 | 7/2015 | Sishtla et al. |
| 9,476,974 | B2 | 10/2016 | Nagy |
| 9,686,789 | B2 | 6/2017 | Gormley et al. |
| 10,061,024 | B1 | 8/2018 | Fersdahl |
| 10,439,743 | B2 | 10/2019 | Tercero Vargas et al. |
| 10,564,256 | B2 | 2/2020 | West et al. |
| 10,567,972 | B2 | 2/2020 | Ghosh et al. |
| 10,641,885 | B2 | 5/2020 | Frick |
| 11,228,982 | B2* | 1/2022 | Gubeskys ............ H04B 1/3838 |
| 11,259,158 | B2 | 2/2022 | Hareuveni et al. |
| 11,375,543 | B2* | 6/2022 | Sanderovich ........ H04B 7/0413 |
| 11,509,441 | B2 | 11/2022 | Pajona et al. |
| 11,902,932 | B2 | 2/2024 | Yoshioka et al. |
| 11,974,267 | B2 | 4/2024 | Yoshioka et al. |
| 12,063,603 | B2 | 8/2024 | Osawa et al. |
| 2004/0145513 | A1 | 7/2004 | Katayama et al. |
| 2006/0055587 | A1 | 3/2006 | Mitsumoto |
| 2013/0321200 | A1 | 12/2013 | Henderson et al. |
| 2014/0254494 | A1* | 9/2014 | Clegg ................. H04W 72/541 |
| | | | 370/329 |
| 2016/0047907 | A1 | 2/2016 | Izadian et al. |
| 2016/0223665 | A1 | 8/2016 | Winstead |
| 2017/0026847 | A1* | 1/2017 | Farshchian ............ G01S 7/021 |
| 2017/0041038 | A1 | 2/2017 | Kirkpatrick et al. |
| 2017/0094651 | A1* | 3/2017 | Green .................. H04W 16/14 |
| 2017/0195887 | A1 | 7/2017 | Jovancevic |
| 2017/0318470 | A1 | 11/2017 | Srikanteswara et al. |
| 2018/0102827 | A1 | 4/2018 | Noh et al. |
| 2018/0199377 | A1* | 7/2018 | Sanderovich ........... G01S 7/023 |
| 2019/0181981 | A1 | 6/2019 | Hwang et al. |
| 2019/0195985 | A1* | 6/2019 | Lin ...................... G01S 7/0233 |
| 2019/0208387 | A1 | 7/2019 | Jiang et al. |
| 2019/0293781 | A1 | 9/2019 | Bolin et al. |
| 2019/0379439 | A1 | 12/2019 | Bolin et al. |
| 2019/0393944 | A1 | 12/2019 | Huang et al. |
| 2020/0003867 | A1 | 1/2020 | Arbabian et al. |
| 2020/0025265 | A1 | 1/2020 | Hedman |
| 2020/0036487 | A1 | 1/2020 | Hammond et al. |
| 2020/0150263 | A1 | 5/2020 | Eitan et al. |
| 2020/0184788 | A1 | 6/2020 | Emmanuel et al. |
| 2020/0187126 | A1 | 6/2020 | Bolin et al. |
| 2020/0322962 | A1 | 10/2020 | Wang et al. |
| 2021/0116560 | A1 | 4/2021 | Gulati et al. |
| 2021/0211348 | A1 | 7/2021 | Li et al. |
| 2021/0231771 | A1 | 7/2021 | Bengtsson |
| 2022/0196798 | A1 | 6/2022 | Chen et al. |
| 2022/0376816 | A1 | 11/2022 | Yoshioka et al. |

FOREIGN PATENT DOCUMENTS

| | | | |
|---|---|---|---|
| WO | 2010101003 | A1 | 9/2010 |
| WO | 2013106740 | A2 | 7/2013 |
| WO | 2013106740 | A3 | 9/2013 |
| WO | 2015130336 | A1 | 9/2015 |
| WO | 2019001160 | A1 | 1/2019 |
| WO | 2019187423 | A1 | 10/2019 |
| WO | 2019233830 | A1 | 12/2019 |
| WO | 2020018179 | A1 | 1/2020 |
| WO | 2020096960 | A1 | 5/2020 |
| WO | 2021028056 | A1 | 2/2021 |
| WO | 2021028057 | A1 | 2/2021 |
| WO | 2022008372 | A1 | 1/2022 |

OTHER PUBLICATIONS

Chiang, Mung et al., "Power Control in Wireless Celllular Networks", Foundations and Trends in Networking, sample, 2008, 1-160.
Niu, et al., "A Survey of Millimeter Wave (mmWave) Communications for 5G: Opportunities and Challenges", Springer Wireless Networks, vol. 21, No. 8, Feb. 25, 2015, 17 pages.
Qi, et al., "Three-dimensional millimetre-wave beam tracking based on smart phone sensor measurements and direction of arrival/time of arrival estimation for 5G networks", IET Microwaves, Antennas & Propagation, vol. 12, No. 3, 2018, 9 pages.
Rasool, I., et al., "RSSI-based Positioning in Unknown Path-Loss Model for WSN", Sensor Signal Processing for Defence, IEEE, XP032433717, Sep. 25, 2012, 1-5.
Dahlman, Erik , et al., "5G NR: The Next Generation Wireless Access Technology", Academic Press, 2018, 469 pages.

* cited by examiner

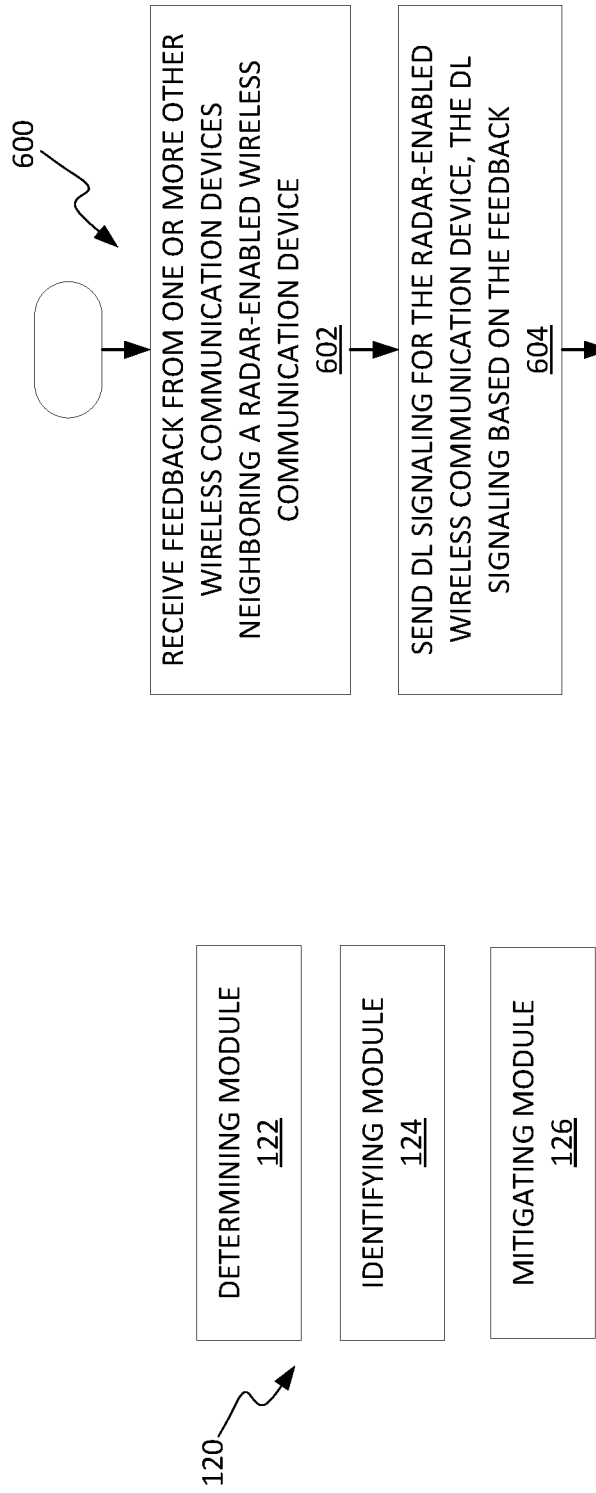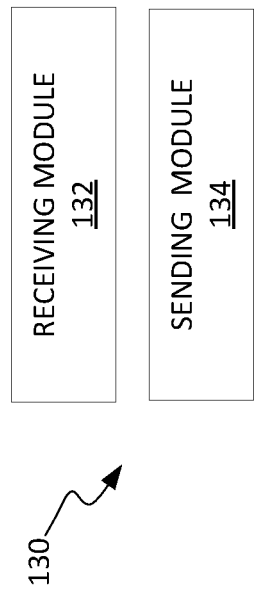

CO-EXISTENCE OPERATIONS INVOLVING A RADAR-ENABLED USER EQUIPMENT AND RADIO NETWORK NODES

TECHNICAL FIELD

The present disclosure relates to radar-enabled user equipments and, specifically, to co-existence operations involving radar-enabled user equipments.

BACKGROUND

Adopting millimeter wave (mmW) frequency ranges for wireless communication networks allows using more antennas with smaller distances, which provides various advantages, including the ability to perform beamforming at the User Equipments (UEs). As a result, device manufactures are equipping UEs, such as those configured for use with communication networks based on Fifth Generation (5G) New Radio (NR) specifications, with antenna panels. Antenna panels can be installed in different locations within a UE and face different directions. In addition, each antenna panel generates different beams depending on the spatial filtering used. Panel orientation changes when the orientation of the UE changes.

The same or similar frequency ranges may be used for radar probing, wherein one or more UEs use radar transmissions for sensing their surrounding environments. As one example, radar probing facilitates autonomous navigation by mobile robots or Autonomous Guided Vehicles (AGVs). As another example, radar probing allows UEs to detect walls or other obstructions proximate to their current position, which may interfere with communications or other operations.

UEs performing radar probing in the same or overlapping mmW frequency range(s) used by wireless communication networks raises the potential for significant interference between radar transmissions and communication transmissions. Such UEs are referred to as "radar-enabled UEs", to denote a wireless communication device that is configured for accessing and using a wireless communication network and further configured to perform radar probing of its surrounding environment.

As used herein, the term "radar" refers to a type of sensing in which one or more radiofrequency signals are transmitted (by one or more transmitters) into a sensing environment, and reflections of those signals received (by one or more receivers). An analysis of the received reflection signals provides information about objects that the signals reflected off of in the sensing environment.

Regarding the operation of radar-enabled UEs, U.S. Pub. 2019/0293781 A1 proposes using separate (orthogonal) resources of a radio channel for transmitting communication signals versus radar signals. While U.S. Pub. 2017/0318470 A1 also considers radar, it more broadly addresses different networks operating in the same shared spectrum, rather than the challenges associated with having radar-enabled UEs operating in a wireless communication network. Similarly, U.S. Pat. No. 10,439,743 B2 addresses radar in the context of wireless communication systems coexisting with, for example, automotive radar systems.

SUMMARY

A radar-enabled wireless communication device is configured to communicate with a wireless communication network and performs radar transmissions using a same or overlapping millimeter wave (mmW) frequency range, determine whether there are any neighboring wireless communication devices that are vulnerable to interference from the radar transmissions and, if so, adapt radar transmissions in the affected radar beam directions or transmit assistance information enabling the vulnerable devices to mitigate or avoid the interference. In a particular example, the wireless communication device performs radar transmissions during a Downlink (DL) phase of the wireless communication network, such that the vulnerability determinations are with respect to DL interference at the neighboring wireless communication devices. Vulnerability determinations may be performed with or without support of the wireless communication network and may be updated responsive to a change in conditions.

In an example embodiment, a wireless communication device includes communication circuitry that is configured to communicate with a wireless communication network and perform radar transmissions for surrounding-environment sensing using a same or overlapping mmW frequency range. The device further includes processing circuitry that is operatively associated with the communication circuitry and configured to determine, for each radar beam direction among a plurality of radar beam directions relative to a current orientation and position of the wireless communication device, whether there are any neighboring wireless communication devices vulnerable to interference from radar transmissions by the wireless communication device with respect to receiving DL communication signals from the wireless communication network. The processing circuitry is further configured to identify any such radar beam directions as being an interfering radar beam direction and, responsive to identifying one or more interfering radar beam directions, perform DL interference mitigation by adapting the radar transmissions or by transmitting assistance information to trigger interference suppression or avoidance by the vulnerable neighboring wireless communication devices.

In another embodiment, a wireless communication device includes communication circuitry that is configured to communicate with a wireless communication network and perform radar transmissions for surrounding-environment sensing using a same or overlapping mmW frequency range. The device further includes a determining module that is configured to determine, for each radar beam direction among a plurality of radar beam directions relative to a current orientation and position of the wireless communication device, whether there are any neighboring wireless communication devices vulnerable to interference from radar transmissions by the wireless communication device with respect to receiving DL communication signals from the wireless communication network. Further, the device includes an identifying module that is configured to identify any such radar beam directions as being an interfering radar beam direction. A mitigating module of the device is configured to perform, in response to the identification of one or more interfering radar beam directions, DL interference mitigation by adapting the radar transmissions or by transmitting assistance information to trigger interference suppression or avoidance by the vulnerable neighboring wireless communication devices.

Another embodiment comprises method of operation by a wireless communication device that communicates with a wireless communication network and performs radar transmissions for surrounding-environment sensing using a same or overlapping mmW frequency range. The method includes determining, for each radar beam direction among a plurality of radar beam directions relative to a current orientation and position of the wireless communication device, whether there are any neighboring wireless communication devices vulnerable to interference from radar transmissions by the wireless communication device with respect to receiving DL communication signals from the wireless communication network. If so, the method includes identifying the radar beam direction as being an interfering radar beam direction and, responsive to identifying one or more interfering radar beam directions, performing DL interference mitigation by adapting the radar transmissions or by transmitting assistance information to trigger interference suppression or avoidance by the vulnerable neighboring wireless communication devices.

Another embodiment comprises a radio network node that is configured for operation in a wireless communication network. The radio network node includes communication circuitry and processing circuitry. The processing circuitry is configured to receive, via the communication circuitry, feedback from one or more other wireless communication devices neighboring a wireless communication device that communicates with the wireless communication network and performs radar transmissions for surrounding-environment sensing using a same or overlapping mmW frequency range. The feedback from each other wireless communication device comprises measurements made by the other wireless communication device on reference signal transmissions by the wireless communication device, and the processing circuitry is configured to send, via the communication circuitry, DL signaling for the wireless communication device. The DL signaling is based on the feedback from the one or more other wireless communication devices and thereby enables the wireless communication device to determine, for each radar beam direction among a plurality of radar beam directions relative to a current orientation and position of the wireless communication device, whether there are any neighboring wireless communication devices vulnerable to interference from radar transmissions by the wireless communication device with respect to receiving DL communication signals from the wireless communication network.

Yet another embodiment comprises a radio network node that is configured for operation in a wireless communication network. The radio network node includes a receiving module that is configured to receive feedback from one or more other wireless communication devices neighboring a wireless communication device that communicates with the wireless communication network and performs radar transmissions for surrounding-environment sensing using a same or overlapping mmW frequency range. The feedback from each other wireless communication device comprises measurements made by the other wireless communication device on reference signal transmissions by the wireless communication device, and the radio network node includes a sending module that is configured to send DL signaling for the wireless communication device. The DL signaling is based on the feedback from the one or more other wireless communication devices and thereby enables the wireless communication device to determine, for each radar beam direction among a plurality of radar beam directions relative to a current orientation and position of the wireless communication device, whether there are any neighboring wireless communication devices vulnerable to interference from radar transmissions by the wireless communication device with respect to receiving DL communication signals from the wireless communication network.

Another embodiment comprises a method performed by a radio network node of a wireless communication network. The method includes receiving feedback from one or more other wireless communication devices neighboring a wireless communication device that communicates with the wireless communication network and performs radar transmissions for surrounding-environment sensing using a same or overlapping mmW frequency range. The feedback from each other wireless communication device comprises measurements made by the other wireless communication device on reference signal transmissions by the wireless communication device, and the method further includes sending DL signaling for the wireless communication device, the feedback based on the feedback from the one or more other wireless communication devices and thereby enabling the wireless communication device to determine, for each radar beam direction among a plurality of radar beam directions relative to a current orientation and position of the wireless communication device, whether there are any neighboring wireless communication devices vulnerable to interference from radar transmissions by the wireless communication device with respect to receiving DL communication signals from the wireless communication network.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 5 is a block diagram of another embodiment of radar-enabled wireless communication device.

FIG. 6 is a logic flow diagram of one embodiment of a method of operation by a radio network node.

FIG. 7 is a block diagram of another embodiment of radio network node.

DETAILED DESCRIPTION

Figure 1:
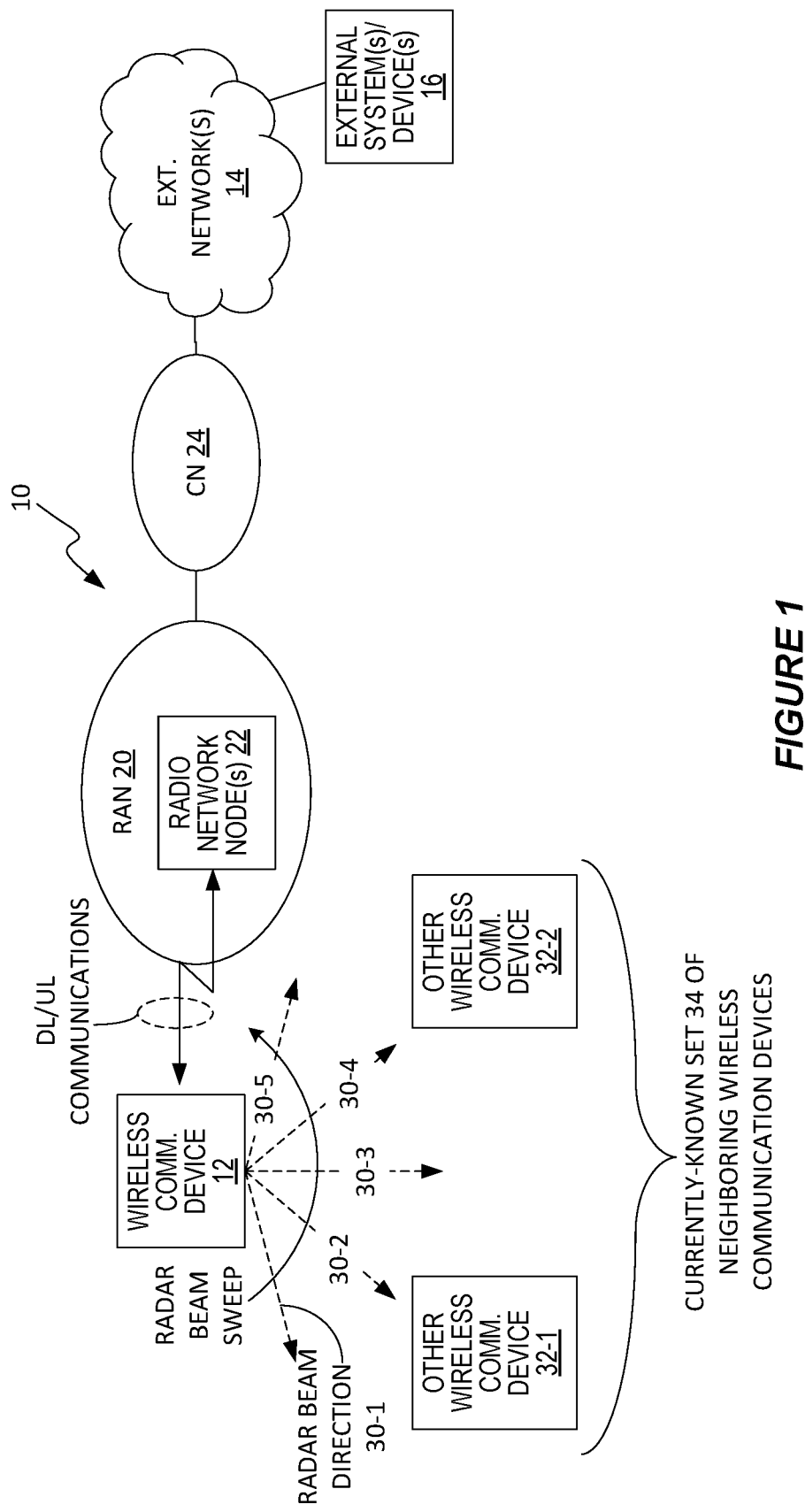
FIG. 1 is a block diagram of one embodiment of a radar-enabled wireless communication device and an associated wireless communication network, which is shown in association with one or more external networks and external devices or systems.

FIG. 1 illustrates an example wireless communication network 10 that operates as an "access network" for a wireless communication device 12, e.g., by communicatively coupling the device 12 to one or more external networks 14 that provide access to one or more external systems or devices 16. Non-limiting examples of communication services provided by the network 10 include voice services and data services and in at least one embodiment the network 10 is configured according to Technical Specifications (TSs) released by the Third Generation Partnership Project (3GPP).

In its example form, the network 10 includes a Radio Access Network (RAN) 20 that includes a number of radio network nodes 22. The nodes 22 may be understood as access points, base stations, or other equipment that is configured to provide the air interface(s)/radio link(s) used to wirelessly connect with the communication device 12. Further, while individual nodes are not illustrated, a Core Network (CN) 24 of the network 10 includes nodes implementing various network functions needed to authenticate and manage the device 12 and to route data to/from the device 12 with respect to the external network(s) 14 and the external systems/devices 16.

At any given time and within any given coverage area of the RAN 20, the network 10 may support a potentially large number of wireless communication devices, also referred to as User Equipments or UEs. The devices may be of varying types and may use different communication services, e.g., some may be smartphones or other personal computing devices, while others are Machine Type Communication (MTC) or Internet-of-Things (IoT) devices, including stationary or embedded devices. FIG. 1 suggests various ones of these scenarios by illustrating other wireless communications devices 32-1 and 32-2, in addition to illustrating the device 12. At any given time, there may be none, one, or multiple other wireless communication devices 32 that neighbor the device 12. Here, "neighbor" means proximate to or in the surrounding vicinity of the device 12, e.g., in a radio-range sense.

While the devices 32 may be of the same type as the device 12, the different reference numbers provide clarity for discussing operations of the device 12 as a radar-enabled device, with respect to the potential for its radar transmissions to interfere with the reception of network communication signals—Downlink (DL) signals—at one or more other wireless communication devices 32. For example, a radar transmission by the device 12 that is coincident with DL transmission targeting another device 32 may interfere with reception of the DL transmission at the other device 32. In this respect, the device 12 is configured to perform radar transmissions along one or more radar beam directions 30, with example directions 30-1 through 30-5 shown by way of example. Note that for the reference number 30 and any other reference numbers shown with suffixing, the corresponding discussion uses suffixed reference numbers only when needed for clarity.

Later diagrams elaborate details of the device 12 but for now consider that the device 12 in one or more embodiments has transmit beamforming capability and has one or more antennas or sets of antenna elements that allow it to perform beamforming in a plurality of directions that are relative to the orientation of the device 12. In an example case, the device 12 uses predefined beam shapes/directions, where such directions may be predefined with respect to the device 12 but, in an absolute sense depend on the current orientation of the device 12.

FIG. 1 suggests that radar transmissions by the device 12 in one or more radar beam directions 30 may interfere with DL reception operations at respective other devices 32, in dependence on a number of factors having complex interrelations. Example factors include the position and/or orientation of the device 12 relative to the other device(s) 32, the position and/or orientation of each other device 32 in relation to the device 12 and/or its serving radio network node 22 in the network 10, the transmission power(s) used by the device 12 for its radar transmissions, the path loss between the device 12 and respective ones of the other devices 32, the frequencies of the communication signals and radar signals, etc.

In a particular example, the network 10 operates according to a Time Division Duplexing (TDD) arrangement that includes a DL phase wherein the network 10 performs DL operations and an UL phase wherein the network 10 performs UL operations, and methods and apparatuses contemplated herein avoid or reduce radar interference by the device 12 with respect to DL reception at one or more other devices 32 during the DL phase of operations. For example, in conjunction with performing a radar beam sweep during a DL phase of operation by the network 10, the device 12 adapts its radar transmissions to avoid transmitting in one or more radar beam directions 30 and/or reduces its radar-signal transmission power in one or more radar beam directions. Such adaptations are not limited, however, to networks using the described UL/DL TDD phases. In at least some embodiments of the device 12 and/or in at least some embodiments of an associated method of operation, the device 12 mitigates or avoids radar interference with respect to DL reception operations by given devices 32 in a currently-known set 34 of neighboring devices 32.

Figure 2:
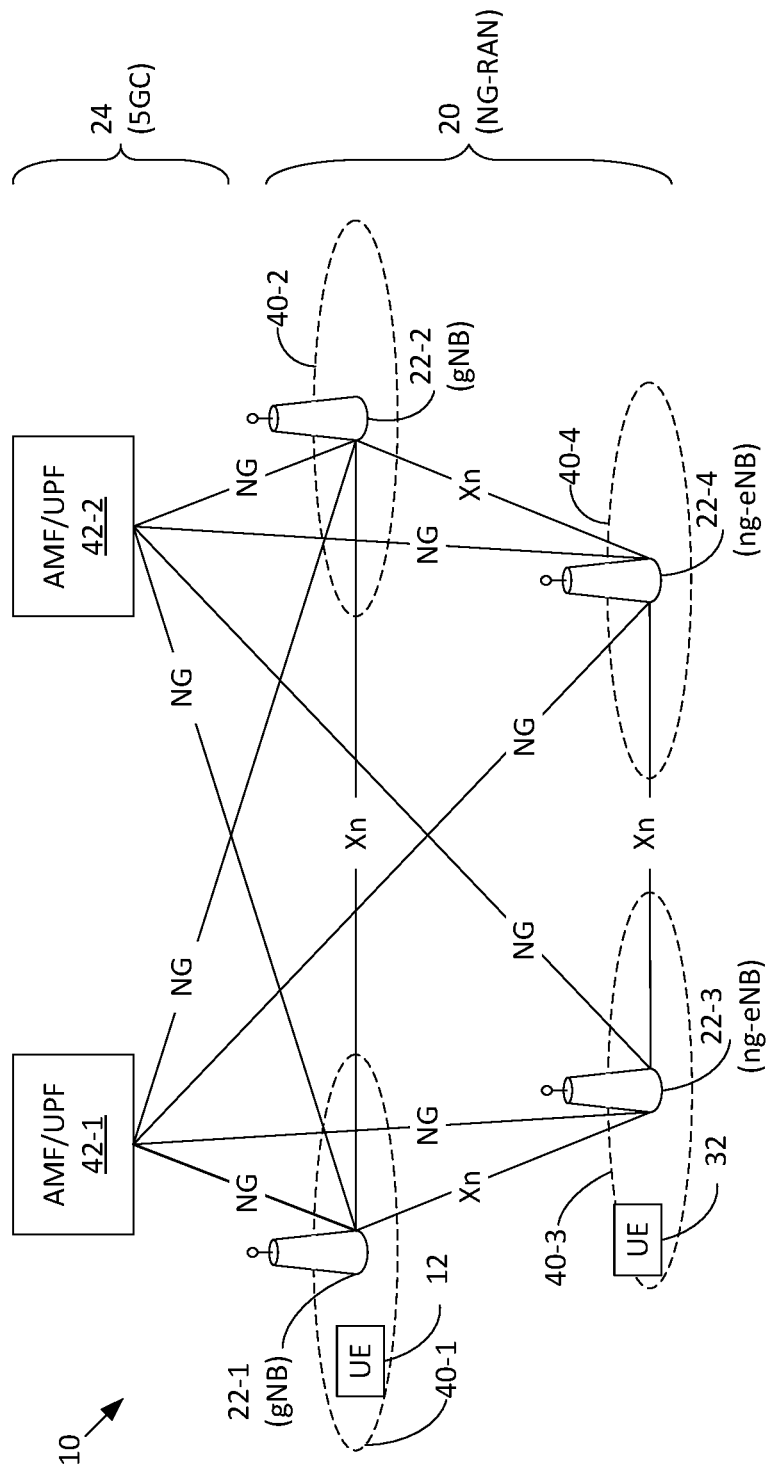
FIG. 2 is a block diagram of another embodiment of a wireless communication network.

FIG. 2 illustrates another example implementation of the network 10, as a Fifth Generation (5G) network having functional elements, interconnections, and operations according to the 5G TS released by the 3GPP. The RAN 20 comprises a Next Generation (NG) RAN wherein one or more radio network nodes provide New Radio (NR) air interfaces.

In particular, in the example depiction, the RAN 20 includes radio network nodes 22 configured as "gNBs" that provide NR air interfaces using the millimeter wave (mmW) frequency range-see the nodes 22-1 and 22-2 configured as gNBs and providing radio coverage in respective coverage areas 40-1 and 40-2. Coverage may be omnidirectional or beamformed or a mix of omnidirectional and beamformed coverage. Additionally, one or more radio network nodes 22 are configured as ng-eNBs, which provide Fourth Generation (4G) Long Term Evolution (LTE) air interfaces but couple to the 5GC-see the nodes 22-3 and 22-4, providing radio service in respective coverage areas 40-3 and 40-4.

The respective coverage areas 40 may overlap at least partly, meaning that NR and LTE air interfaces may be available to a device 12 operating in a location having overlapping coverage, and it should be understood that the devices 12 and 32 depicted in the diagram are shown merely for example. A greater or lesser number of devices may be using the network 10 and may have any given distribution among the respective coverage areas. It should also be understood that radar transmissions from a given device 12 may interfere with the DL reception operations at essentially any other type of device 32, regardless of whether the other device 32 is radar-enabled, to the extent that such transmissions are in frequency range relevant to the DL transmissions.

Figure 3:
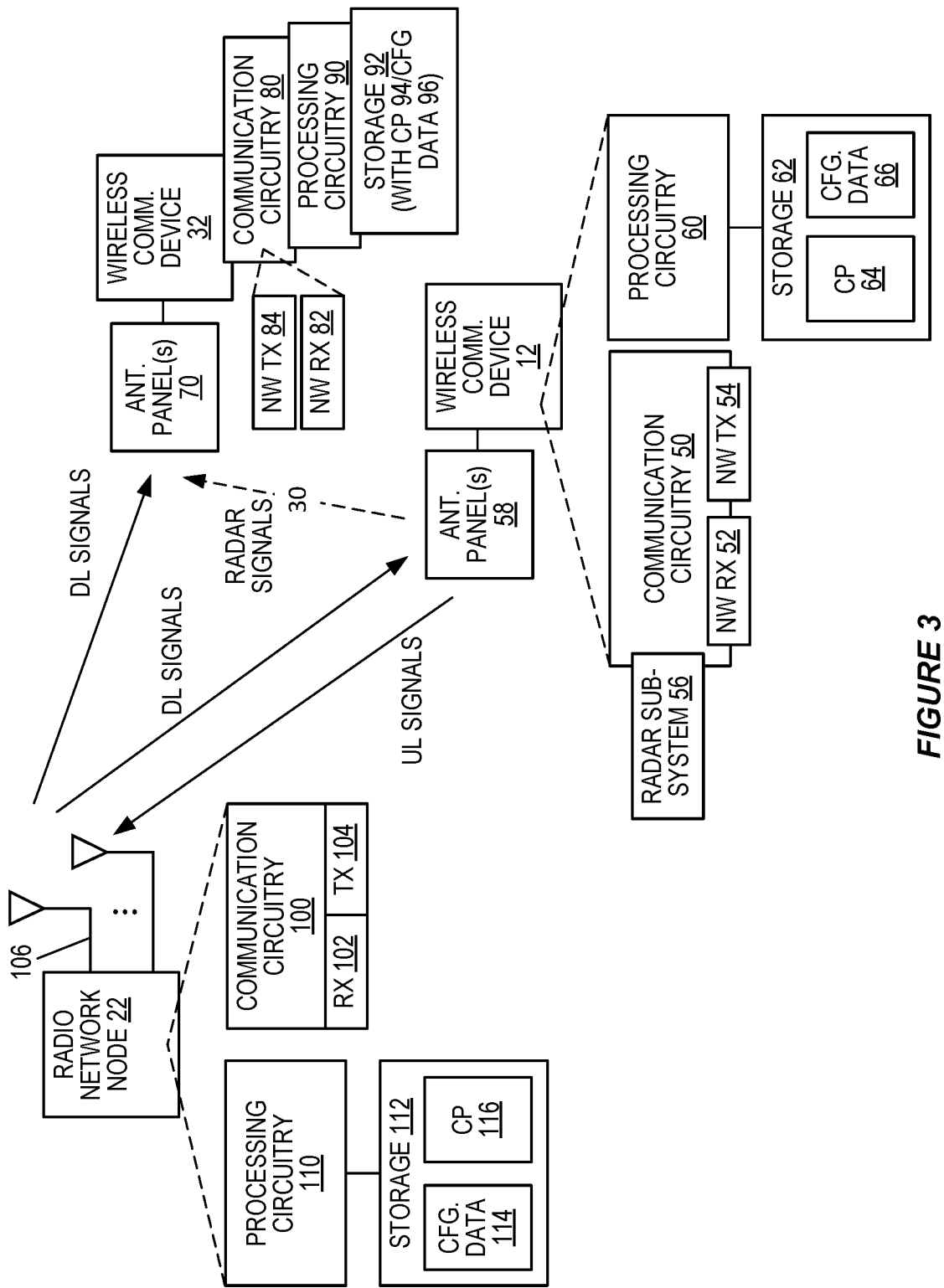
FIG. 3 is a block diagram of example embodiments of a radio network node configured for operation in a wireless communication network, and two wireless communication devices configured for using the network, where at least one of the devices is a radar-enabled device.

FIG. 3 offers an illustrative example, where radar signals transmitted by a device 12 potentially interfere with the reception at a neighboring device 32 of DL signals transmitted by a radio network node 22 of a wireless communication network—i.e., one or more radar beam directions 30 used by the device 12 may be problematic with respect to DL reception operations at the neighboring device 32. In this example, the device 12 is configured for communicating with a wireless communication network and performing radar transmissions for surrounding-environment sensing using a same or overlapping mmW frequency range and the device 12 includes communication circuitry 50 that is configured for wireless communications with respect to the wireless communication network, e.g., the network 10, and for radar transmissions.

In an example implementation, the communication circuitry 50 comprises receiver circuitry 52 (NW RX 52) and transmitter circuitry 54 (NW TX 54) that is configured for receiving DL signals from given radio network nodes 22 of the network 10 and for transmitting UL signals to given nodes 22 of the network 10. The communication circuitry 50 also includes a radar sub-system 56 that is configured for radar probing—i.e., surrounding-environment sensing based on transmitting radar signals and receiving reflected radar signals in return. In an advantageous but non-limiting example, the radar subsystem 56 reuses all or at least a portion of the circuitry (and antennas) used for communicating with the network 10—e.g., reuse of at least a portion of the receiver circuitry 52 and the transmitter circuitry 54, based on performing radar-signal transmissions in a mmW frequency range that is the same as or overlaps with one or more of the mmW frequency ranges used for communicating with the network 10. Of course, the radar subsystem 56 also may include additional circuitry, such as reception-timing circuitry used to measure return reflections of the transmitted radar signals and it may interface with and/or reuse portions of processing circuitry 60 included in the device 12.

The processing circuitry 60 comprises fixed circuitry or programmatically-configured circuitry or a mix of both types of circuitry. In non-limiting example implementations, the processing circuitry 60 comprises or includes digital processing circuitry, such as one or more microprocessors, Digital Signal Processors (DSPs), Field Programmable Gate Arrays (FPGAs), Application Specific Integrated Circuits (ASICs), Systems on a Chip (SoC) circuits, etc., along with supporting circuitry, such as clocking, interfacing, and power-management circuitry.

In at least one implementation, the processing circuitry 60 comprises one or more computer circuits that are specially adapted to carry out the device-side operations described in any of the device-related embodiments described herein, based at least in part on the execution of computer program instructions stored in a computer-readable media. To that end, in at least one embodiment, the device 12 includes storage 62 comprising one or more types of computer-readable media that store one or more computer programs (CP) 64 and may store related configuration data (CFG. DATA) 66. The storage 62 comprises one or more types of memory circuits or devices and/or one or more types of storage devices, such as volatile working memory for program execution and non-volatile memory for longer-term program storage. Examples include SRAM, DRAM, FLASH memory, EEPROM, Solid State Disk (SSD), etc. Such memory provides for non-transitory storage, which does not necessarily mean unchanging or permanent storage but does connote storage of at least some persistence.

The processing circuitry 60 is operatively associated with the communication circuitry 50, e.g., it uses the communication circuitry 50 to exchange data and control signaling with the network 10 and/or it controls operations of the communication circuitry 50. Further, in an example implementation, the processing circuitry 60 is configured to carry out several device-side operations for avoiding or mitigating DL interference caused by radar transmissions from the device 12.

In an example embodiment of the device 12, the communication circuitry 50 is configured to communicate with a wireless communication network 10 and perform radar transmissions for surrounding-environment sensing using a same or overlapping mmW frequency range. That is, the device 12 performs radar probing using mmW frequencies that are the same as or are relevant to the mmW frequencies used by the wireless communication network 10 for transmitting DL signals.

The processing circuitry 60 of the device 12 is operatively associated with the communication circuitry 50 and is configured to determine, for each radar beam direction 30) among a plurality of radar beam directions 30 relative to a current orientation and position of the device 12, whether there are any neighboring wireless communication devices 32 vulnerable to interference from radar transmissions by the device 12 with respect to receiving DL communication signals from the network 10 and, if so, identify the radar beam direction 30 as being an interfering radar beam direction 30. Such an arrangement can be understood as the processing circuitry 60 being configured to classify respective ones of the radar beam directions 30 as being restricted or unrestricted—where "restricted" means that radar transmissions by the device 12 in the respective radar beam direction 30 are known or estimated as causing DL reception interference at a neighboring device 32, and "unrestricted" means that radar transmissions by the device 12 in the respective radar beam direction 30 is known or estimated as not causing DL reception interference at a neighboring device 32. The beam classifications may be updated by the processing circuitry 60 in response to a change in any condition or circumstance bearing on the classifications.

The processing circuitry 60 is configured to perform, responsive to identifying one or more interfering radar beam directions 30, DL interference mitigation by adapting the radar transmissions or by transmitting assistance information to trigger interference suppression or avoidance by the vulnerable neighboring wireless communication devices 32. As one example, the assistance information comprises interference-suppression information—e.g., signal timing, resource usage, or other signal-structure information—that enables a vulnerable neighboring device 32 to suppress the interfering radar signal via interference cancelation. As another example, the assistance information comprises position and/or orientation information of the device 12, or position/orientation information relative to a neighboring device 32, such that the neighboring device 32 can select a different DL transmit beam and/or DL receive beam, for use in receiving DL signals from its serving radio network node 22.

In at least one embodiment, the wireless communication network 10 comprises a RAN 20 having a TDD configuration that defines alternating phases of operation consisting of a DL phase. The RAN 20 transmits DL signals to given wireless communication devices 12, 32, and an UL phase, wherein the RAN 20 receives UL signals from given wireless communication devices 12, 32. The device 12 in one or more embodiments is configured for operation according to 5G network standards released by the 3GPP.

To determine whether there are any neighboring devices 32 vulnerable to interference from radar transmissions by the device 12, in at least one embodiment the processing circuitry 60 is configured to perform, via the communication circuitry 50, a radar beam sweep through the plurality of radar beam directions 30 using a defined transmission power, and receive feedback information indicating whether or what extent the radar transmissions comprised in the radar beam sweep were detected by one or more other wireless communication devices 32. For example, the feedback indicates signal-strength measurements made by the other devices 32 on reference signal transmissions made by the device 12 during the radar beam sweep. The radar beam sweep uses the radar beam directions 30 or uses beam directions that correspond to them e.g., each beam direction used for the sweep directionally aligns with a radar beam direction 30.

To receive the feedback information, the processing circuitry 60 in one or more embodiments is configured to receive, via the communication circuitry 50, the feedback information from the other device(s) 32 directly via Device-to-Device (D2D) signaling or indirectly via Over-The-Top (OTT) signaling conveyed from the other device(s) 32 to the device 12 via the network 10. That is, the OTT signaling represents communications between the device(s) 32 and the device 12 that are exchanged via the network 10, such as by each other device 32 establishing a communication session with the device 12.

In an example scenario, the one or more other devices 32 comprise or belong to a currently-known set 34 of neighboring devices 32, as known to the device 12 via detection of UL signal transmissions by given neighboring devices 32 or via D2D discovery operations or via the reception of neighboring-device information from the network 10. Correspondingly, in at least some embodiments of a radio network node 22, the radio network node 22 is configured to send assistance information to a device 12—i.e., a radar—enabled UE—that identifies the currently neighboring devices 32. The node 22 determines such information based on obtaining or determining the respective positions of the devices 12 and 32.

The processing circuitry 60 in one or more embodiments is configured to transmit, via the communication circuitry 50, configuration information for the currently-known set 34 of neighboring devices 32 directly via D2D signaling or indirectly via OTT signaling. The configuration information indicates a time at which the radar beam sweep will be performed or radio resources to be used for the radar beam sweep. Such information enables the neighboring device(s) to make measurements during the radar beam sweep that indicate whether or to what extent radar transmissions by the device 12 cause or are expected to cause DL reception interference at the respective neighboring devices 32.

The processing circuitry 60 in one or more embodiments is configured to receive the feedback information—as generated by the neighboring device(s) 32—as DL control signaling from the network 10. The DL control signaling is based on the one or more other devices 32 sending Channel State Information CSI reports to the network 10 that are based on received-signal measurements made by the one or more other devices 32 during the radar beam sweep. The CSI reports may be the same as or based on the reporting structure, reporting channels, etc., used for "legacy" reporting of CSI by the devices 32 with respect to their reception of DL signals from their serving radio network node(s) 22. Further, in terms of the DL signaling being based on the feedback from the neighboring device(s) 32, the DL signal may convey the feedback or otherwise indicate the feedback or may be derived from the feedback.

The processing circuitry 60 in one or more embodiments is configured to determine whether there are any neighboring devices 32 vulnerable to interference from radar transmissions by the device 12 by, for neighboring devices 32 currently known to the device 12, obtaining position and/or orientation information for respective ones among the known neighboring devices 32. The processing circuitry 60 obtains such information either based on the device 12 directly receiving it via D2D signaling or indirectly receiving it via OTT signaling conveyed through the network 10. The processing circuitry 60 in such embodiments is further configured to evaluate the position information and/or orientation for each known neighboring device 32 in relation to the current position and orientation of the wireless communication device 12.

The processing circuitry 60 in one or more embodiments is configured to determine whether there are any neighboring devices 32 vulnerable to interference from radar transmissions by the device 12 by detecting UL transmissions by one or more other devices 32 and evaluating received-signal strengths of the detected UL transmissions.

In one or more embodiments, the processing circuitry 60 is configured to obtain position information for respective ones of the one or more other devices 32, use the position information and the received-signal strengths to estimate path losses between the device 12 and respective ones of the one or more other devices 32, and determine whether any of the one or more other devices 32 are vulnerable, based on the received-signal strengths and the estimated path losses. In at least one embodiment, the processing circuitry 60 is further configured to obtain orientation information for respective ones of the one or more other devices 32, because the orientation indicates the directions of the beams of the respective other device(s) 32, or at least provides a basis for determining those directions.

The processing circuitry 60 in one or more embodiments is configured to perform the DL interference mitigation by avoiding radar transmissions in the interfering radar beam directions 30 or adapting transmission power for radar transmissions in the interfering radar beam directions 30. Further, in at least some embodiments, the processing circuitry is configured to update, in response to fulfillment of a triggering condition, the determination of whether there are any neighboring devices 32 vulnerable to interference from radar transmissions by the device 12, and update the adaptation of the radar transmissions or transmit updated assistance information.

The triggering condition is any one or more of: detecting more than a threshold change in position or orientation of the device 12: receiving information indicating more than a threshold change in position or orientation of any neighboring devices 32: detecting more than a threshold change in one or more conditions of a surrounding physical environment of the device 12 that bear on propagation of radar transmissions by the device 12: a change in transmission frequency or bandwidth used by the device 12 for radar transmissions: or expiration of an update timer started in relation to a most-recent iteration of determining whether there are any neighboring devices 32 vulnerable to interference from radar transmissions by the wireless communication device 12.

The other wireless communication devices 32 may or may not be radar-enabled devices and may or may not be of the same type as the example device 12. However, FIG. 3 illustrates than a neighboring other device 32 may comprise communication circuitry 80, with network receiver circuitry 82 and network transmitter circuitry 84, processing circuitry 90, storage 92, which may store one or more computer programs 94 and configuration data 96. The device 32 also may include one or more antenna panels 70 for communicating with a wireless communication network 10.

Figure 4:
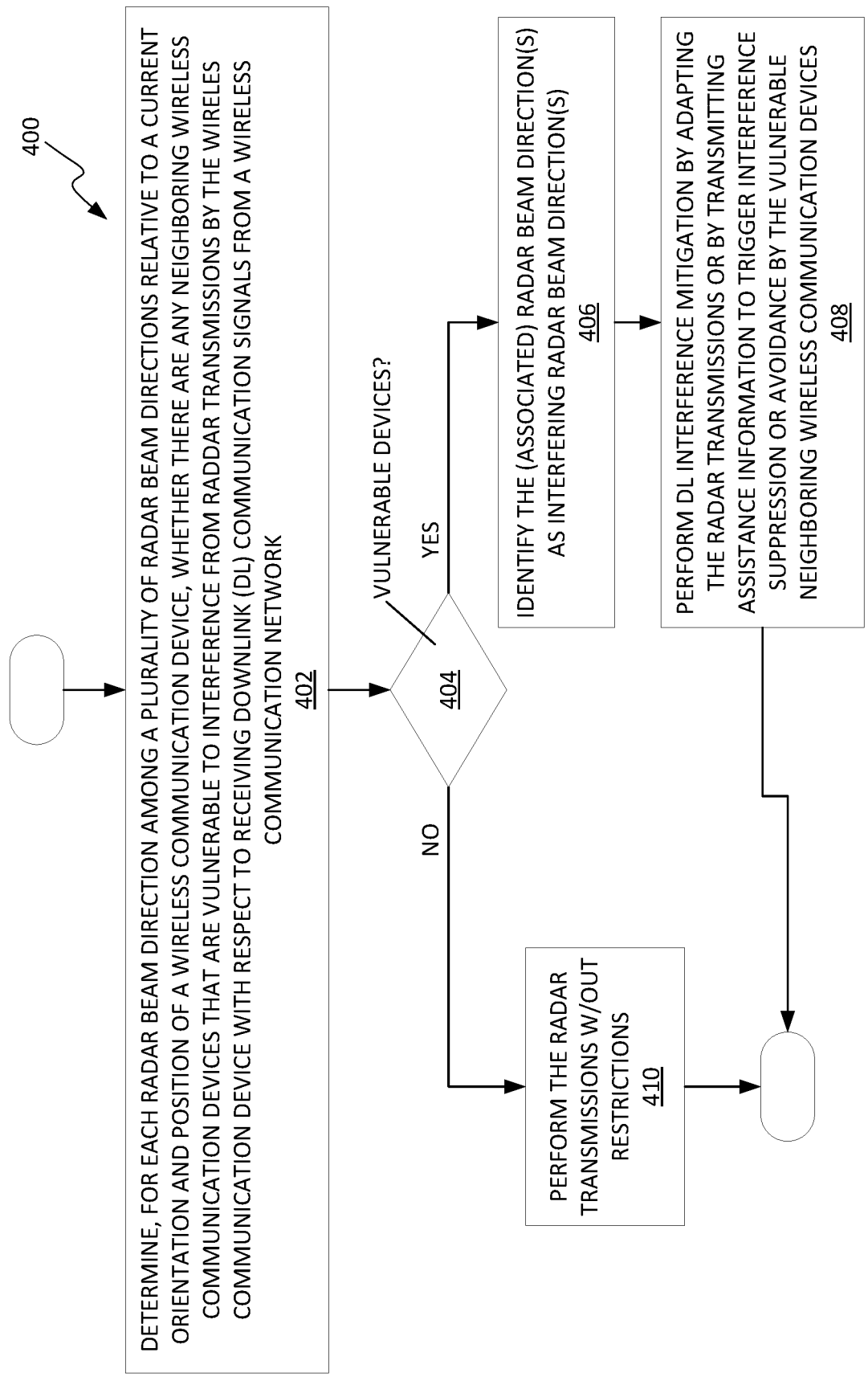
FIG. 4 is a logic flow diagram of one embodiment of a method of operation by a radar-enabled wireless communication device.

FIG. 4 illustrates another embodiment, comprising a method 400 of operation performed by a wireless communication device that communicates with a wireless communication network and performs radar transmissions for surrounding-environment sensing. In an example scenario, the device and network in question are the device 12 and the network 10 described earlier. Using that example scenario, the method 400 includes the device 12 performing a determining operation (Block 402). For each radar beam direction 30 among a plurality of radar beam directions 30 relative to a current orientation and position of the device 12, the device 12 determines whether there are any neighboring devices 32 vulnerable to interference from radar transmissions by the device 12 with respect to receiving DL communication signals from the network. If so (YES from Block 404), the method 400 includes the device 12 identifying (Block 406) the radar beam direction 30 as being an interfering radar beam direction 30.

The method 400 further includes, responsive to the device 12 identifying one or more interfering radar beam directions 30, the device 12 performing (Block 408) DL interference mitigation by adapting the radar transmissions or by transmitting assistance information to trigger interference suppression or avoidance by the vulnerable neighboring devices 32. If the device 12 does not identify any vulnerable neighboring devices 32 (NO from Block 404), the method 400 includes the device 12 performing radar transmissions without restrictions (Block 410)—i.e., it does not adapt or control its radar transmissions in specific consideration of known or estimated DL reception interference at a neighboring device 32.

Determining (Block 402) whether there are any neighboring devices 32 vulnerable to interference from radar transmissions by the device 12 comprises, for example, the device 12 performing a radar beam sweep through the plurality of radar beam directions 30 using a defined transmission power, and receiving feedback information indicating whether or what extent the radar transmissions comprised in the radar beam sweep were detected by one or more other devices 32. The feedback information may be received from one or more other devices 32 directly via D2D signaling or indirectly via OTT signaling conveyed from the one or more other devices 32 to the device 12 via the network 10.

In at least one example scenario, the one or more other devices 32 comprise or belong to a currently-known set 34 of neighboring devices 32, as known to the device 12 via detection of UL signal transmissions by given neighboring devices 32 or via D2D discovery operations or via the reception of neighboring-device information from the network 10. The method 400 may include or be based on the device 12 repeatedly looking for or discovering neighboring devices 32, and it will be understood that the number, distance, and orientation of neighboring devices 32 may change over time, e.g., with movement of the device 12 or with movement of the other devices 32 around it. Further, other conditions may change, such as changes in the frequency/frequencies used by the device 12 and/or changes in the ambient environment, that trigger the device 12 to reassess whether there are any vulnerable neighboring devices 32. Another item or condition that may change is the "beam pairing" in use for any given neighboring device 32, where "beam pairing" refers to the beam pairing between the device 32 and its serving radio network node 22. Radar sensing by the device 12 may interfere with communications conducted on one beam pairing but not on another beam pairing (or at least not cause interference above some acceptable threshold). Thus, a change in beam pairing at a neighboring device 32 may change which directions should be considered restricted or unrestricted by the device 12, with respect to radar sensing.

One or more embodiments of the method 400 include the device 12 transmitting configuration information for the currently-known set 34 of neighboring devices 32 directly via D2D signaling or indirectly via OTT signaling. The configuration information indicates a time at which the radar beam sweep will be performed or radio resources to be used for the radar beam sweep. Such information enables neighboring devices 32 to listen for the radar transmissions of the radar beam sweep.

Receiving the feedback information in one or more embodiments of the method 400 comprises the device 12 receiving DL control signaling from the network 10. The DL control signaling is based on the one or more other devices 32 sending CSI reports to the network 10 that are based on received-signal measurements made by the one or more other devices 32 during the radar beam sweep. The same radio network node 22 of the network 10 may serve the device 12 and the one or more other devices 32, in which case the radio network node 10 natively has access to the CSI reports for sending the DL control signaling to the device 12. Alternatively, two or more radio network nodes 22 are involved in receiving the CSI reports and sending the DL control signaling and they may rely on inter-node signaling to exchange the involved data and/or coordination and control signaling.

In at least one implementation, the determining operation (Block 402) of the method 400 comprises, for neighboring devices 32 currently known to the device 12, obtaining position and/or orientation information for respective ones among the known neighboring devices 32 directly via D2D signaling or indirectly via OTT signaling conveyed through the network 10. The determining operation (Block 402) in this example implementation further includes the device 12 evaluating the position and/or orientation information for each known neighboring device 32 in relation to the current position and orientation of the device 12. For example, the device 12 evaluates the position/orientation information for the device 12 and a neighboring device 32, to determine whether any of its radar beam directions 30 are pointing at the neighboring device 32.

Determining (Block 402) whether there are any neighboring devices 32 vulnerable to interference from radar transmissions by the device 12 comprises, in one or more other example embodiments, the device 12 detecting UL transmissions by one or more other devices 32 and evaluating received-signal strengths of the detected UL transmissions.

The method 400 may also include the device 12 obtaining position information for respective ones of the one or more other devices 32, and using the position information and the received-signal strengths to estimate path losses between the device 12 and respective ones of the one or more other wireless communication devices 32. Correspondingly, the device 12 determines (Block 402) whether any of the one or more other devices 32 are vulnerable, based on the received-signal strengths and the estimated path losses.

Performing (Block 408) the DL interference mitigation comprises, for example, the device 12 avoiding radar transmissions in the interfering radar beam directions 30 or adapting transmission power for radar transmissions in the interfering radar beam directions 30. The device 12 may use avoidance for all interfering beam directions 30, or may use power-reduction for all interfering beam directions 30, or may use avoidance or power-reduction for any given interfering beam direction 30 in dependence on the extent or amount of interference known or estimated with respect to that direction.

For example, the device 12 may use a lower interference threshold—e.g., expressed in known or estimated received-signal strength—to classify individual radar beam directions 30 as being restricted or unrestricted. Then, for each restricted direction, if the known or estimated interference is below an upper interference threshold, the device 12 considers the radar beam direction 30 as being conditionally restricted, meaning that it does not exclude the direction from radar scanning, but uses a lower transmission power than it would otherwise use when scanning in that radar beam direction 30. However, if the known or estimated interference for a restricted direction exceeds the upper threshold, the device 12 considers that radar beam direction 30 as being unconditionally restricted and it skips/avoids it when performing radar scanning, e.g., when performing a next radar scan.

Of course, the device 12 may periodically reassess its radar beam directions 30 or reassess them on a triggered basis. In at least one embodiment, the method 400 includes, responsive to fulfillment of a triggering condition, the device 12 updating the determination of whether there are any neighboring devices 32 vulnerable to interference from radar transmissions by the device 12, and updating the adaptation of the radar transmissions or transmitting updated assistance information. By way of example, the triggering condition is any one or more of: detecting more than a threshold change in position or orientation of the device 12: receiving information indicating more than a threshold change in position or orientation of any neighboring devices 32: detecting more than a threshold change in one or more conditions of a surrounding physical environment of the device 12 that bear on propagation of radar transmissions by the device 12: a change in transmission frequency or bandwidth used by the device 12 for radar transmissions: or expiration of an update timer started in relation to a most-recent iteration of determining whether there are any neighboring devices 32 vulnerable to interference from radar transmissions by the device 12.

Frequency and/or bandwidth changes arise, for example, as a consequence of the network 10 changing the configuration of the device 12, e.g., reconfiguring the frequency range and/or bandwidth used for communications between the device 12 and its serving radio network node(s) 22 in the network 10. In cases where the device 12 performs radar scanning at the same frequencies and/or same bandwidths as used for communicating with the network 10, or in any situation where the radar-scanning frequencies and/or bandwidths depend on the frequencies/bandwidths used by the device 12 with respect to the network 10, changing communication-frequency/bandwidths affects radar-scanning operations. Environmental changes include, for example, rain starting or stopping or changing in intensity.

FIG. 5 illustrates another embodiment of a wireless communication device 12 comprising a set of processing units or modules 120. The modules comprise, for example, functional arrangements of processing circuitry and may be implemented, for example, via the execution of computer program instructions.

The illustrated set of modules 120 includes a determining module 122 that is configured to determine, for each radar beam direction 30 among a plurality of radar beam directions 30 relative to a current orientation and position of the device 12, whether there are any neighboring devices 32 vulnerable to interference from radar transmissions by the device 12 with respect to receiving DL communication signals from a network 10. For any such radar beam directions 30, the set of modules 120 includes an identifying module 124 that is configured to identify the radar beam direction 30 as being an interfering radar beam direction 30. Further, the set of modules 120 includes a mitigating module 126 that, responsive to the identification of one or more interfering radar beam directions 30, is configured to perform DL interference mitigation by adapting the radar transmissions or by transmitting assistance information to trigger interference suppression or avoidance by the vulnerable neighboring devices 32.

Turning back to FIG. 3 for a depiction of an example arrangement for a radio network node 22, the illustrated node 22 includes communication circuitry 100, including receiver (RX) circuitry 102 and transmitter (TX) circuitry 104. One or more antennas 106 (or arrays of antenna elements) are associated with the communication circuitry 100, for transmitting DL signals to given wireless communication devices and receiving UL signals from such devices.

Further, the node 22 includes processing circuitry 110. The processing circuitry 110 comprises fixed circuitry or programmatically-configured circuitry or a mix of both types of circuitry. In non-limiting example implementations, the processing circuitry 110 comprises or includes digital processing circuitry, such as one or more microprocessors, Digital Signal Processors (DSPs), Field Programmable Gate Arrays (FPGAs), Application Specific Integrated Circuits (ASICs), Systems on a Chip (SoC) circuits, etc., along with supporting circuitry, such as clocking, interfacing, and power-management circuitry.

In at least one implementation, the processing circuitry 110 comprises one or more computer circuits that are specially adapted to carry out the network-node-side operations described in any of the node-related embodiments described herein, based at least in part on the execution of computer program instructions stored in a computer-readable media. To that end, in at least one embodiment, the node 22 includes storage 112 comprising one or more types of computer-readable media that store one or more computer programs 116 and may store related configuration data 114. The storage 112 comprises one or more types of memory circuits or devices and/or one or more types of storage devices, such as volatile working memory for program execution and non-volatile memory for longer-term program storage. Examples include SRAM, DRAM, FLASH memory, EEPROM, Solid State Disk (SSD), etc. Such memory provides for non-transitory storage, which does not necessarily mean unchanging or permanent storage but does connote storage of at least some persistence.

The processing circuitry 110 is operatively associated with the communication circuitry 100, e.g., it uses the communication circuitry 100 to send and receive wireless signaling to/from wireless devices. In one or more examples, the processing circuitry 110 is configured to receive, via the communication circuitry 100, feedback from one or more other wireless communication devices 32 neighboring a wireless communication device 12 that communicates with the wireless communication network 10 and performs radar transmissions for surrounding-environment sensing using a same or overlapping mmW frequency range. The feedback from each other device 32 comprises, for example, measurements made by the other device 32 on reference signal transmissions by the device 12, such as reference-signal transmissions in a radar beam sweep by the device 12.

Further, the processing circuitry 110 is configured to send, via the communication circuitry 100, DL signaling for the device 12. The DL signaling is based on the feedback from the one or more other devices 32 and thereby enables the device 12 to determine, for each radar beam direction 30 among a plurality of radar beam directions 30 relative to a current orientation and position of the device 12, whether there are any neighboring devices 32 vulnerable to interference from radar transmissions by the device 12 with respect to receiving DL communication signals from the network 10.

In one or more embodiments, the processing circuitry 110 is configured to receive the feedback as Channel State Information (CSI) reports from the one or more other devices 32, where the CSI reports are based on received-signal measurements made by the one or more other devices 32 during a radar beam sweep performed by the device 12.

FIG. 6 illustrates an example method 600 performed by a radio network node 22 of a wireless communication network 10. The method 600 includes the radio network node 22 receiving (Block 602) feedback from one or more other wireless communication devices 32 neighboring a wireless communication device 12 that communicates with the network 10 and performs radar transmissions for surrounding-environment sensing using a same or overlapping mmW frequency range. The feedback from each other device 32 comprises measurements made by the other device 32 on reference signal transmissions by the device 12. Further, the method 600 includes the radio network node 22 sending (Block 604) DL signaling for the device 12.

The DL signaling is based on the feedback from the one or more other devices 32 and thereby enables the device 12 to determine, for each radar beam direction 30 among a plurality of radar beam directions 30 relative to a current orientation and position of the device 12, whether there are any neighboring devices 32 vulnerable to interference from radar transmissions by the device 12 with respect to receiving DL communication signals from the network 10.

Receiving (Block 602) the feedback information comprises, for example, the radio network node 22 receiving CSI reports from the one or more other devices 32. Here, the CSI reports are based on received-signal measurements made by the one or more other devices 32 during a radar beam sweep performed by the device 12.

FIG. 7 illustrates another embodiment of a radio network node, e.g., another example implementation for the node 22 introduced in FIG. 1. Here, the node 22 comprises a collection of processing units or modules 130, which may be functional processing units implemented via underlying processing circuitry. The modules 130 may, for example, be implemented as virtual processing elements in a virtualization environment, such as may be hosted by a computer server in a data center that may be remote from the physical-layer circuitry used to anchor the radio air interface.

The depicted modules 130 include a receiving module 132 that is configured to receive feedback from one or more other wireless communication devices 32 neighboring a wireless communication device 12 that communicates with the network 10 and performs radar transmissions for surrounding-environment sensing using a same or overlapping mmW frequency range. The feedback from each other device 32 comprises measurements made by the other device 32 on reference signal transmissions by the device 12. Further, the radio network node 22 includes a sending module 134 that is configured to send DL signaling for the device 12.

The DL signaling is based on the feedback from the one or more other devices 32 and thereby enables the device 12 to determine, for each radar beam direction 30 among a plurality of radar beam directions 30 relative to a current orientation and position of the device 12, whether there are any neighboring devices 32 vulnerable to interference from radar transmissions by the device 12 with respect to receiving DL communication signals from the network 10. The receiving module 132 is configured to receive the feedback, for example, as CSI reports that are based on received-signal measurements made by the one or more other devices 32 during a radar beam sweep performed by the device 12.

The techniques described above in the various embodiments allow a radar-enabled wireless communication device 12, also referred to as a radar-enabled User Equipment (UE), to avoid causing interference towards other UEs when the radar-enabled UE performs radar sensing. In an example implementation, the radar-enabled UE is configured for operation in a 5G network and its mitigation operations avoid or reduce DL reception interference at surrounding UEs during the DL phase of the network's UL/DL TDD operation.

Multiple approaches are contemplated, including UE-coordinated DL interference mitigation that is autonomous—i.e., it does not require network support and relies on interference mitigation via interference sensing. For example, the radar-enabled UE may employ a sidelink (D2D) or OTT-based messaging approach to collect DL interference information experienced by surrounding UEs while it sweeps the radar beam. The Inertial Measurement Unit (IMU) information of the radar-enabled UE and other UEs may also be collected because the IMU information indicates the direction of the radar signal source and the listening UE. The radar-enabled UE uses this information to select the radar beam directions and/or adjust the transmitted power of the radar signal in respective radar beam directions such that the interference caused to other UEs is below the threshold. Sharing the positioning data of the other UEs is an optional step that further improves the technique. Rather than listening for radar transmissions from the radar-enabled UE using all their antenna panels and receive (Rx) beams, the surrounding UEs may be configured to save power by listening for radar interference using only the panels/beams that are paired with their serving radio network nodes 22 in the network 10. The radio network node(s) 22 may be referred to as base stations (BSs).

In at least one embodiment, the radar-enabled UE supports beam correspondence and, during a scenario where it is free of network-related communication tasks during the UL phase of TDD operations, it senses the UL transmissions of the surrounding UEs to identify the radar beam directions that are deemed problematic in terms of causing DL reception interference at the surrounding UEs. That is, the radar-enabled UE listens for the UL transmissions from surrounding UEs using the same or aligned beam directions used by it for performing radar transmissions, based on the correspondence or reciprocity between Tx and Rx beams at the radar-enabled UE, and it uses the received signal power of the UL signals it receives to estimate the amount of radar interference that would be experienced at the corresponding surrounding UEs.

Interference mitigation may also include or be based on information sharing, where the radar-enabled UE and the surrounding UEs share position and IMU information and paired-beam information using D2D or OTT messaging. The radar-enabled UE uses such information to adjust the direction and power level of its radar transmissions. In addition, the radar-enabled UE in at least one embodiment asks the surrounding UEs to change the beams used by them for pairing with their serving BSs, to thereby avoid radar interference during the DL phase. The surrounding UEs can share the time, frequency, panel identification, and/or beam information with the radar-enabled UE, with the radar-enabled UE using that information to adapt its radar transmissions, to avoid the times, frequencies, and spatial dimensions relevant to DL reception at the surrounding UEs.

Other embodiments use network-coordinated DL interference mitigation where one or more such approaches do not require cooperation among all of the involved UEs. In at least one embodiment, the wireless communication network configures the surrounding UEs in a cell or in a cell region to report the interference levels they experience from radar transmissions by a radar-enabled UE. In a particular example, the serving BS(s) associated with the surrounding UEs configure them to use "legacy" CSI reporting mechanism, e.g., LTE, or NR Frequency Range 1 (FR1), to report the interference levels they experience with respect to the radar-enabled UE performing a radar beam sweep. This approach does not require sidelink or OTT based sharing of interference-sensing information between the radar-enabled and surrounding UEs.

Among the multiple advantages attending one or more of the embodiments disclosed herein is the mitigation of interference experienced at one or more UEs with respect to the reception of DL signals from a wireless communication network, in a case where another nearby UE is radar-enabled and performs radar scanning of its surrounding environment using radar signals that are in the same frequency range as the DL signals. For example, a given UE includes a mmW transceiver that is configured for sending and receiving communication signals to/from a wireless communication network, and the UE uses the mmW transceiver for transmitting radar signals, for surrounding-environment sensing.

As noted, the radar-enabled UE and the proximate (surrounding) UEs may cooperate to mitigate the radar interference without need for network assistance. Alternatively, the surrounding UEs use a CSI reporting mechanism to the network, and the network conveys that information to the radar-enabled UE. The various embodiments allow for complementary radar scans because some beams of the radar-enabled UE may be restricted during the UL phase of the network's operation, while the same beams may be unrestricted during the DL phase of the network's operation. One or more of the various embodiments also contemplate controlling whether or to what extent radar transmissions are restricted in dependence on the criticality of the communications that are subject to the interference and/or a likelihood that the radar transmissions will interfere with communication signals of the network.

In 5G NR, the UE and the BS use the mmWave frequencies—denoted as Frequency Range 2 or FR2—in TDD mode for communication. Although using this frequency range opens a wide spectrum, it is highly susceptible to blockage and attenuation. Hence, communications between a UE and its serving BS rely on finding a suitable pairing of Tx/Rx beams. If another, nearby UE performs radar scanning, its radar transmissions may interfere with UL reception at network BSs or DL reception at nearby UEs, in dependence on whether the radar transmissions coincide with the UL or DL phase of TDD operation. The level of interference depends on the distance between the radar-enabled UE and the other UEs. Depending on the distance and orientation of the other UEs, the radar-enabled UE may change the strength or direction of the radar signals adaptively. Alternatively, the surrounding UEs may use time, frequency, or spatial domain adaptations to avoid/reduce the interference they experience, or they may switch to other beams directions for coupling to the network, to avoid the radar interference.

Taking an example case where there is a radar-enabled UE and one or more surrounding UEs, an embodiment of radar interference mitigation contemplated herein involves DL sensing by the surrounding UEs. In an example implementation, the radar-enabled UE sends a "test" radar signal and the surrounding UEs, which can be in the current or neighboring cells of the wireless communication network, evaluate their experienced DL interference. The surrounding UEs report the interference levels for the different radar beam directions via OTT or D2D messaging to the radar-enabled UE. Then, the radar-enabled UE adjusts its radar signal power in the radar beam directions that are problematic, as assessed from reported levels of DL interference experienced at respective ones of the surrounding UEs. In one embodiment, the radar-enabled UE may use the UL Sounding Reference Signal (SRS) as a "test" radar signal and the other UEs perform "DL measurements" during a signaled UL SRS sweep interval.

In at least one embodiment, one or more of the surrounding UEs have analog beamforming capability, and they sequentially listen through all beams of their antenna panels or only listen through the panels and beams that are paired with their serving BS(s). They collect samples through the antenna elements of their antenna panels and process them in baseband. A surrounding UE with digital beamforming capability may "listen" for radar interference through all of its beams at the same time.

Use of the radar "test" scan at the radar-enabled UE and the corresponding "listening" at the surrounding UEs requires time synchronization among the radar-enabled and the surrounding UEs and may involve sharing position and IMU information of the surrounding UEs and/or radar-enabled UE, radar beam indexes, transmission time of the radar signal, the radar sweep interval, the time/frequency resource allocations used for transmission of the radar beams during the test sweep, and radar code information. As noted, such information can be shared via D2D or OTT messaging. If the beam sweep sequence of the radar-enabled UE is known and the UEs are synchronized, it is unnecessary to share the radar beam index.

Figure 8A:
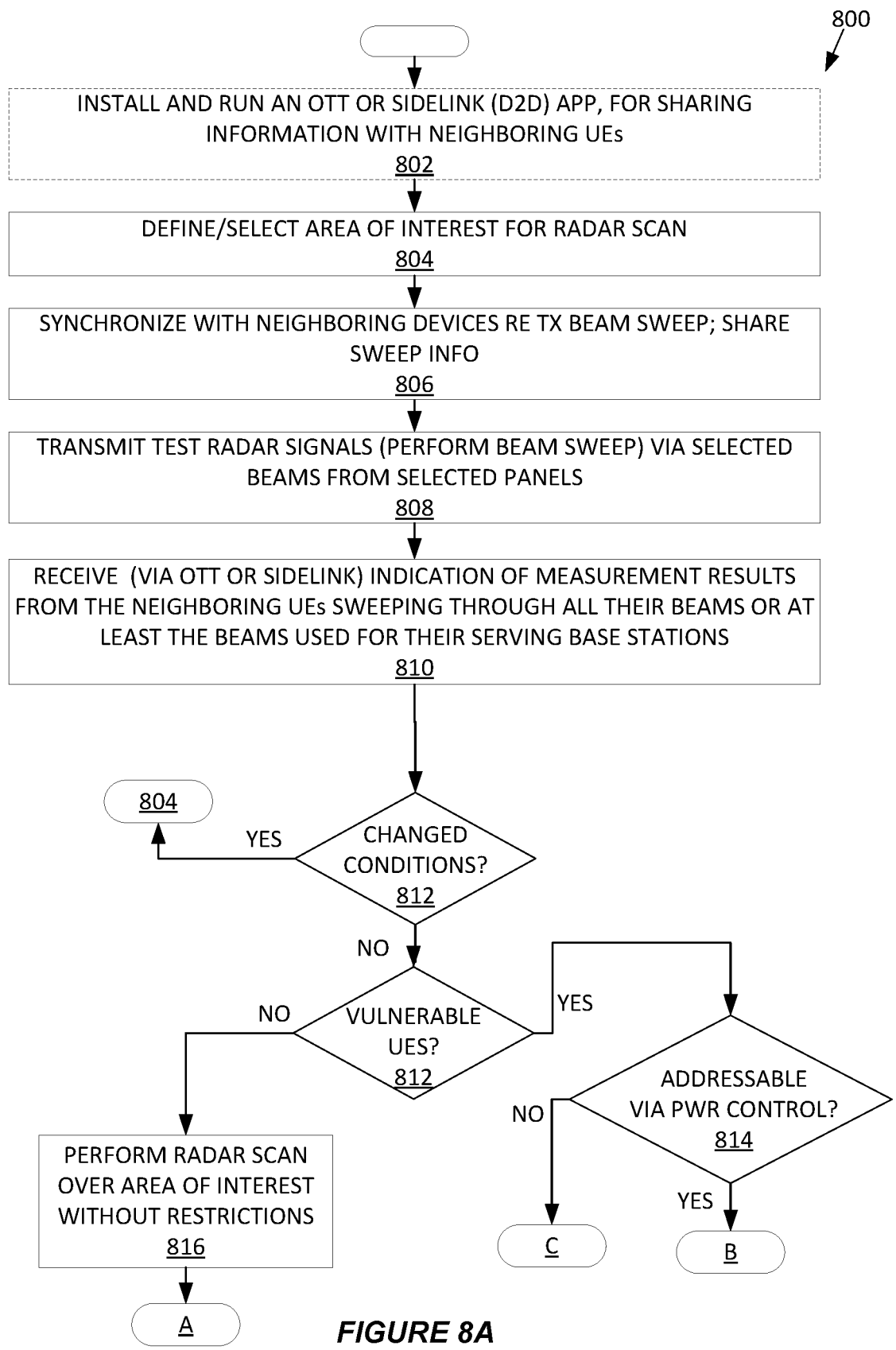
FIGS. 8A/B, 9, and 10A/B are logic flow diagram of further embodiments of method of operation for mitigating DL interference caused by radar scanning of radar-enabled User Equipment (UE).

FIG. 8A/B illustrate a corresponding method 800 of operation where a radar-enabled UE installs and runs an OTT or sidelink application for sharing information with other UEs (Block 802). The radar-enabled UE defines or otherwise selects an area of interest for radar scanning, which may be defined in terms of angular ranges for scanning the surrounding environment (Block 804), and it synchronizes with neighboring UEs regarding its performance of one or more radar-signal test sweeps (Block 806)—e.g., it shares the sensing time, sweep interval, radar beam indexes, radar-signal information, IMU information, and it may receive information from the neighboring UEs, such as IMU information, etc.

The radar-enabled UE then transmits test radar signals—i.e., performs the test sweep via selected beams from selected antenna panels of the radar-enabled UE (Block 808). Here, the selected beams/panels correspond to the area of interest for radar scanning. The radar-enabled UE receives (via OTT or sidelink message) indications of the measurement results from the neighboring UEs (Block 810). As noted, each neighboring UE may "listen" for the test sweep by the radar-enabled UE using all of its beams/panels or just a subset of them, such as just the beams/panels that it currently uses for coupling to the wireless communication network.

The radar-enabled UE checks whether conditions have changed (Block 812), where the "conditions" considered include changed frequency ranges, changed environmental conditions, changed position and/or orientation, or essentially any change that bears on whether or to what extent its radar transmissions may interfere with network communications involving other UEs. The check may be conditioned on defined thresholds, e.g., such that more than a marginal change is required. If the condition(s) have changed (YES from Block 812), processing returns to Block 804. If not (NO from Block 812), the radar-enabled UE assesses the information returned to it for the test sweep and determines whether there are any vulnerable neighboring UEs (Block 812). Here, a "vulnerable" UE is a neighboring UE that experienced more than a threshold amount of interference during the test sweep.

If there are one or more vulnerable UEs (YES from Block 812), processing continues with the radar-enabled UE determining whether the interference problem(s) can be addressed via power control (Block 814). In making this assessment, the radar-enabled UE considers whether its radar transmissions in any problematic beam direction can be reduced in power to a level that reduces the interference experienced at the affected neighboring UE(s) to an acceptable level while still having sufficient power to yield meaningful radar-scanning results. The level of power that is sufficient in this regard will depend on the nature or purpose of the scanning: likewise, the acceptable level of interference may be a fixed threshold or may be a variable threshold that depends on the criticality of the affected communications or other factors.

If the interference vulnerabilities can be addressed with power control (YES from Block 814), processing continues along path "B". If not (NO from Block 814), processing continues along path "C". If there are no vulnerable neighboring UEs (NO from Block 812), processing continues with the radar-enabled UE performing the radar scan over the area of interest without restrictions (Block 816)—i.e., without spatial restrictions that involve skipping transmissions in certain beam directions and/or reducing transmission power in certain beam directions. From there, processing continues along path "A".

Figure 8B:
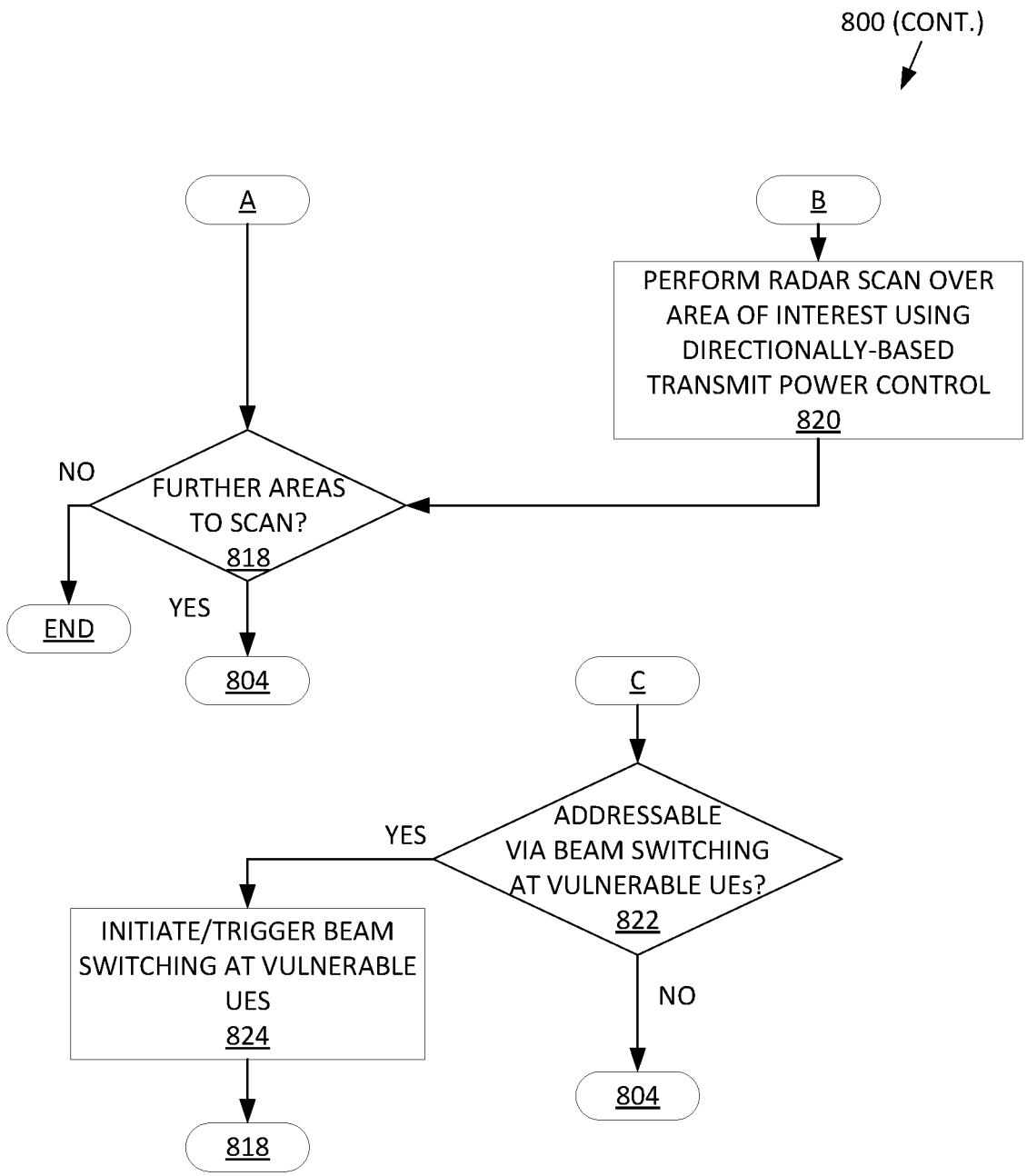

As seen in FIG. 8B, the path-A processing includes the radar-enabled UE determining whether there are any further areas to scan. If so, (YES from Block 818), processing returns to Block 804. If not, (NO from Block 818), processing "ends" at least for purposes of the current cycle of radar scanning.

The path-B processing includes the radar-enabled UE performing the radar scan over the area of interest using directionally-based transmit power control (Block 820). That is, in the radar beam directions 30 that correspond to neighboring UEs determined to be vulnerable to radar interference, the radar-enabled UE adapts the transmit power it uses for the radar signal. Upon completion of the scan, processing continues to Block 818.

The path-C processing includes the radar-enabled UE determining whether the radar interference vulnerabilities can be addressed via beam switching at the vulnerable neighboring UEs (Block 822). Here, "beam switching" refers to a vulnerable UE changing the Tx/Rx beam pair that is used between the wireless communication network and the vulnerable UE for DL signal transmission/reception. Depending on the beam arrangements in play and the position of the vulnerable UE relative to its serving BS and the radar-enabled UE, there may be a beam pairing for which the neighboring UE will experience no radar interference or interference of an acceptably low amount.

If the interference problem is addressable via beam switching (YES from Block 822), the method 800 continues with initiating or otherwise triggering beam switching at the vulnerable UE(s) (Block 824). In one example, the radar-enabled UE initiates the beam switching via signaling towards the vulnerable UE(s). In another example, the vulnerable UE(s) indicate to the radar-enabled UE whether beam switching can be used to address the interference problem and they initiate the switch and, possibly, confirm the switch to the radar-enabled UE. From there, processing progresses to Block 818.

If the interference problem is not addressable via beam switching (NO from Block 822), processing returns to Block 804. That is, the NO path from Block 822 corresponds to a scenario where the interference problem cannot be solved by spatially-dependent power control of the radar transmissions and cannot be solved by beam switching at the vulnerable UEs. As such, the UE returns to Block 804, for defining/selecting an area of interest for radar scanning. While the processing of Block 804 may initially comprise the radar-enabled UE simply selecting a desired area for scanning, upon returning to Block 804 from Block 822, the radar-enabled UE may select/define a radar scanning area that excludes directions associated with the vulnerable UEs.

Now consider embodiments that involve network-coordinated DL interference mitigation via sensing, where such embodiments provide a robust, non-autonomous mode of interference mitigation. While such embodiments require support of the involved wireless communication network, they have the advantage of not requiring cooperation between all involved UEs.

The network cooperates and may configure UEs in a cell or in a region of a cell to report interference levels via a legacy CSI reporting mechanism. Periodic and aperiodic reporting are available. In this approach, the Channel State Information Reference Signal (CSI-RS) resources are defined but the BS transmits no signal on the defined resources. As such, the designated resources may be denoted as zero-power CSI-RS resource. Rather than the BS transmitting CSI-RS on the zero-power CSI-RS resources, the radar-enabled UE uses them to perform test radar transmissions—a test radar beam sweep—and the surrounding UEs perform measurements on the zero-power CSI-RS resources to assess the level of interference they experience with respect to the radar transmissions. The surrounding UEs send corresponding measurement reports to the network, which then determines whether any of them would experience unacceptable levels of DL interference as a consequence of the radar transmissions, or the network forwards the report(s) to the radar-enabled UE for such assessment.

Figure 9:
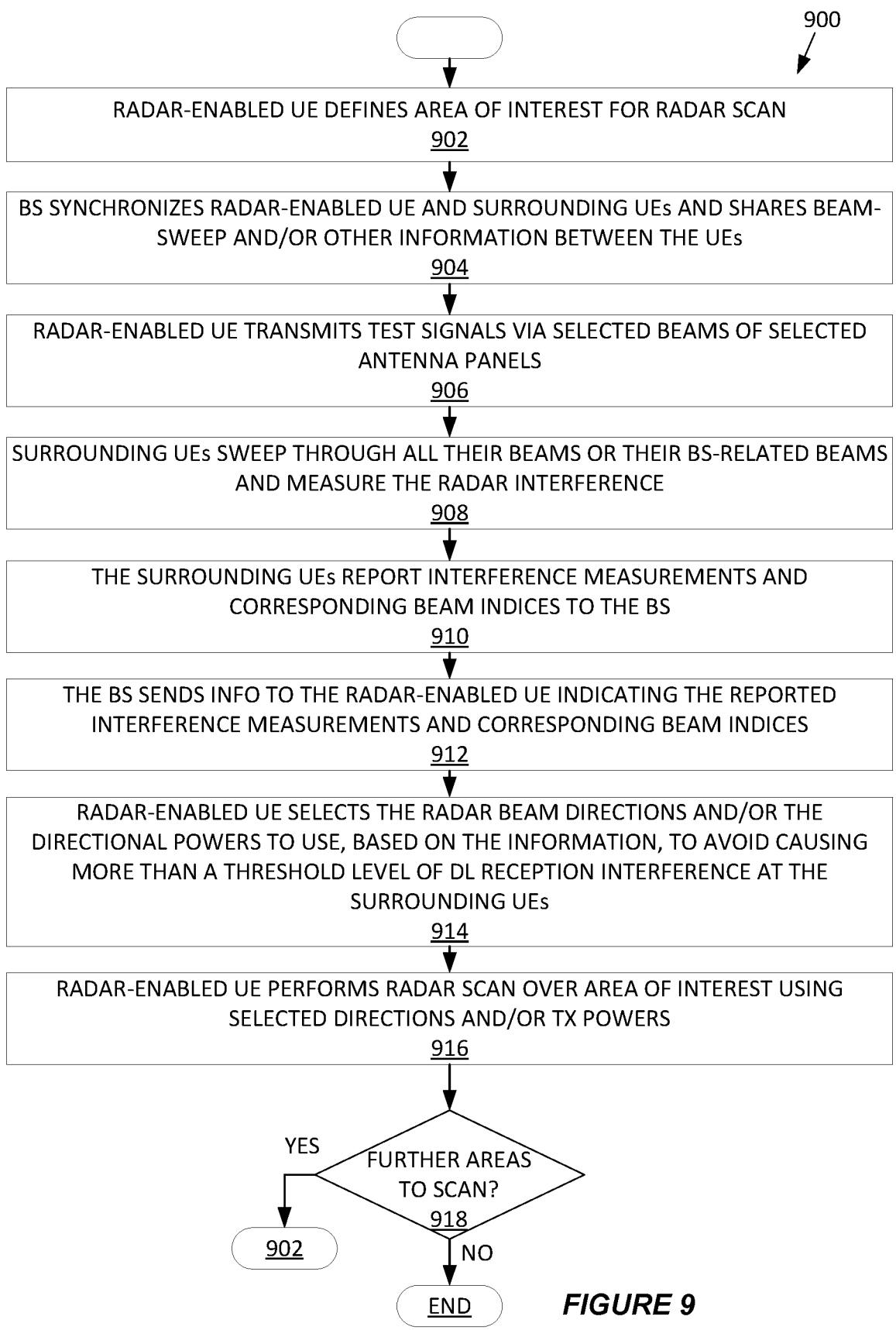

FIG. 9 illustrates an example method 900 of operation, for network-supported interference mitigation. The radar-enabled UE defines the area of interest for radar scanning (Block 902), and the BS synchronizes the radar-enabled UE and its surrounding UEs and shares the relevant information among the UEs (Block 904), e.g., the zero-power CSI-RS allocations, beam sweep timing, beam indexes, etc.

Operations continue with the radar-enabled UE transmitting test signals via the selected beams and selected antenna panels, as determined by the defined area of the radar scan (Block 906) and the surrounding UEs sweep through all or a subset of their Rx beams, such a just the beams currently used for receiving DL signals from their serving BS(s), and measure the interference experienced from the test signals transmitted by the radar-enabled UE (Block 908). The surrounding UEs report the interference measurements and corresponding beam indexes to the BS (Block 910), and the BS sends information to the radar-enabled UE indicating the reported interference measurements and corresponding beam indexes (Block 912).

The radar-enabled UE uses the information received from the BS to select the radar beam directions and/or the directional powers to use for radar scanning, to avoid causing more than a threshold level of DL reception interference at the surrounding UEs (Block 914). The radar-enabled UE then performs radar scanning according to the selected directions/powers (Block 916). If there are further areas to scan (YES from Block 918), processing returns to Block 902. If not, (NO from Block 918), processing "ends" at least with respect to the current cycle of interference assessment and radar scanning.

In at least one embodiment, the radar-enabled UE has Tx/Rx beam correspondence and it supports UL sensing and it is configured to listen to the UL transmissions of the surrounding UEs during one or more UL phases of the network's TDD operation, to identify radar beam directions 30 that are problematic—i.e., that are expected to cause unacceptable levels of DL reception interference at a neighboring UE. In more detail, the received-signal power experienced at the radar-enabled UE for an UL signal received from a surrounding UE for a given Rx beam direction at the radar-enabled UE directly suggests the level of interference that the surrounding UE would experience during the DL phase from a radar transmission by the radar-enabled UE on the reciprocal Tx beam direction. Such operations assume that the orientation and the position of the sensed UEs remain fixed in one UL-DL period.

The surrounding UEs may infrequently transmit uplink signals, hence, the radar-enabled UE needs sufficiently long scan periods to sense the UL transmission of the surrounding UEs. The surrounding UEs can share the time/frequency of their uplink transmission with the radar-enabled UE via sidelink or OTT messaging, for more accurate UL sensing by the radar-enabled UE.

Another embodiment of interference mitigation relies on the use of sidelink or OTT messaging to exchange information between the radar-enabled UE and the surrounding UEs, but does not involve a "test" radar sweep by the radar-enabled UE to assess the interference vulnerabilities of the surrounding UEs. The radar-enabled and the other UEs share the following information: the position of the surrounding UEs, the orientation of the surrounding UEs, e.g., using the IMU information, the beams of the panels of the surrounding UEs that are paired with the BS for network-based communications, the inactivity period(s) of the surrounding UEs, the properties of the radar signal to be transmitted by the radar-enabled UE, e.g., in terms of waveform and sequence, the identity (ID) of the radar-enabled UE, and the time/frequency of the radar transmission.

Interference mitigation then involves one or more of: the radar-enabled UE performing radar scanning when the surrounding UEs are inactive, the radar-enabled UE uses the shared information to adjust the radar signal strength and/or skip transmissions in certain directions, one or more of the surrounding UEs switching to another beam to receive DL signals and thereby avoid radar interference, or the surrounding UEs using the shared characteristics of the radar signal to configure their radiofrequency (RF) receiver circuitry or corresponding baseband processing circuitry to suppress the radar inference.

Figure 10A:
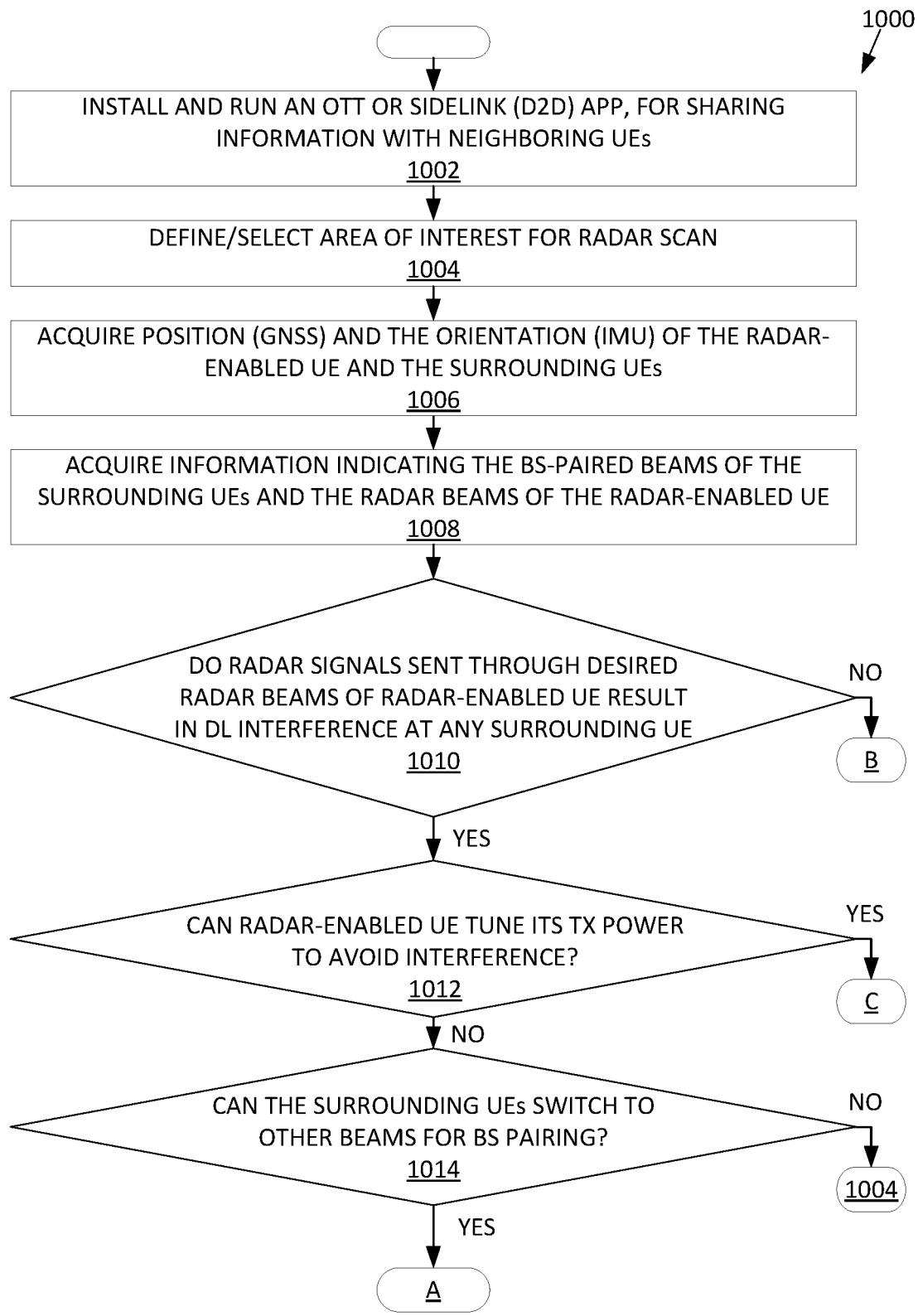

FIG. 10A/B illustrates yet another method 1000 of mitigating interference associated with radar transmissions from a radar-enabled UE, with respect to DL reception operations at one or more other UEs that are proximate to the radar-enabled UE. Here, it may be noted that the term "UE" does not denote equipment of a specific type or purpose and may be used broadly to describe a varied mix of equipment types, which may include one or more types of Machine-to-Machine (M2M) or Internet-of-Things (IoT) devices. However, the term does generally denote a communication apparatus that is operative to use a communication network, e.g., for accessing one or more communication services, but is not a dedicated or fixed part of the network. For example, a UE accesses the network based on having or being associated with subscription credentials that provide a basis for authenticating and authorizing the UE for such access.

In the example of FIG. 10A/B, the method 1000 includes the radar-enabled UE installing/running a sidelink or OTT application for sharing information with other UEs (Block 1002), e.g., any given other UEs that are proximate to it at a given point in time. The method 1000 further includes the radar-enabled UE defining/selecting an area of interest for radar scanning (Block 1004) and acquiring the position and orientation of the surrounding UEs, along with obtaining its own position and orientation (Block 1006). "Position" may be expressed as a geographic location, e.g., as determined from a Global Navigation Satellite System (GNSS), and orientation may be indicated by IMU information, e.g., as determined by the respective UEs from internal accelerometers or gyroscopic sensors.

The radar-enabled UE further acquires information indicating the BS-paired beams of the surrounding UEs (Block 1008), e.g., in terms of their relevance to the radar beam directions of the radar-enabled UE for its current position and orientation. The method 1000 further includes the radar-enabled UE determining whether radar signals sent through desired radar beam directions (corresponding to the area of interest) result in DL interference at any of the surrounding UEs (Block 1010). If not, processing continues along path "B". If so, processing continues with the radar-enabled UE determining whether it can address the interference issue by tuning (adapting) the transmit power it uses in the involved beam directions, to avoid causing the interference (and this may be determined in view of some threshold limit on the maximum level of interference that is deemed acceptable or tolerable at the victim UE) (Block 1012).

If the interference issues are assessed as being addressable via transmit power tuning (NO from Block 1012), processing continues along path "C". If not, processing continues to Block 1014, where the radar-enabled UE assesses whether the interference problem can be addressed via beam-switching at the surrounding UEs that are vulnerable to the interference. If beam-switching is available as a solution, processing continues with path "A" and otherwise processing returns to Block 1004.

Figure 10B:
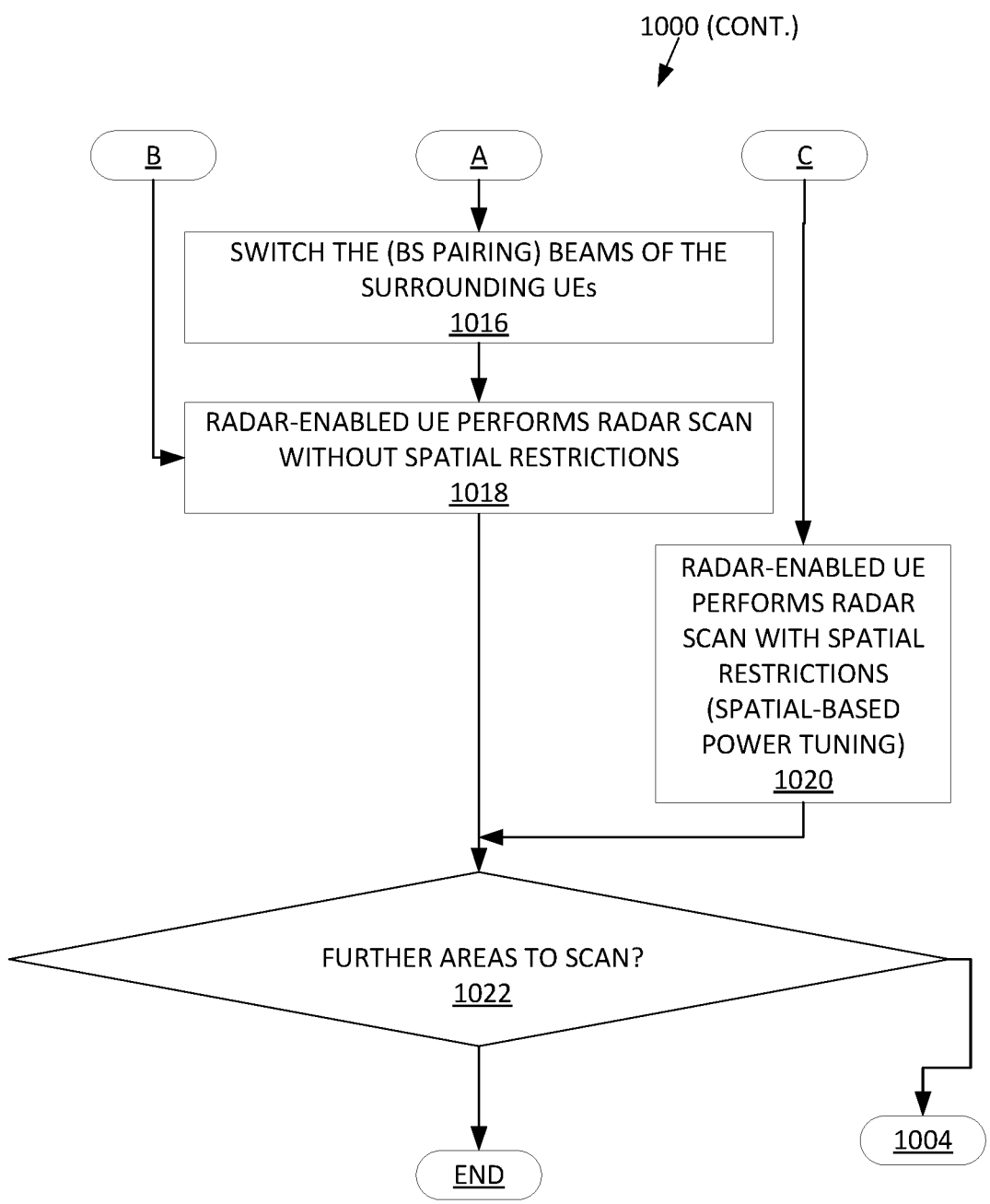

FIG. 10B illustrates the processing paths A, B, and C, with processing path A involving a switch of the BS-pairing beams at the affected (vulnerable) ones of the surrounding UEs (Block 1016) and the radar-enabled UE performing the radar scan without spatial restrictions (Block 1018). Processing path B does not involve or require beam-switching at the vulnerable UEs, and also includes performing the radar scan without spatial restrictions (Block 1018). Processing path C also does not involve beam-switching at the vulnerable UEs but does involve the radar-enabled UE performing the radar scan with spatial restrictions (Block 1020), where the restrictions are directionally-dependent power tunings that reduce radar-signal power in the radar beam directions associated with the vulnerable UEs.

All three processing paths A, B, and C flow into Block 1022, in which the radar-enabled UE determines whether there are further areas in which to perform radar scans. If not, processing ends at least for purposes of the current radar-scanning cycle. If so, processing returns to Block 1004.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operation by a wireless communication device that communicates with a wireless communication network and performs radar transmissions for surrounding-environment sensing using a same or overlapping millimeter wave (mmW) frequency range, the method comprising:
   determining, for each radar beam direction among a plurality of radar beam directions relative to a current orientation and position of the wireless communication device, whether there are any neighboring wireless communication devices vulnerable to interference from radar transmissions by the wireless communication device with respect to receiving Downlink (DL) communication signals from the wireless communication network and, if so, identifying the radar beam direction as being an interfering radar beam direction; and
   responsive to identifying one or more interfering radar beam directions, performing DL interference mitigation by adapting the radar transmissions to account for the one or more interfering radar beam directions or by transmitting assistance information with respect to the one or more interfering radar beam directions to trigger interference suppression or avoidance by the vulnerable neighboring wireless communication devices;
   wherein determining whether there are any neighboring wireless communication devices vulnerable to interference from radar transmissions by the wireless communication device comprises performing a radar beam sweep through the plurality of radar beam directions using a defined transmission power and receiving feedback information indicating whether or to what extent the radar transmissions comprised in the radar beam sweep were detected by one or more other wireless communication devices.

2. The method of claim 1, wherein the wireless communication network comprises a Radio Access Network (RAN) having a Time Division Duplexing (TDD) configuration that defines alternating phases of operation consisting of a DL phase, wherein the RAN transmits DL signals to given wireless communication devices, and an Uplink (UL) phase, wherein the RAN receives UL signals from given wireless communication devices.

3. The method of claim 1, wherein the wireless communication device is configured for operation according to Fifth Generation (5G) network standards released by the Third Generation Partnership Project (3GPP).

4. The method of claim 1, wherein receiving the feedback information comprises receiving the feedback information from the one or more other wireless communication devices directly via Device-to-Device (D2D) signaling or indirectly via Over-The-Top (OTT) signaling conveyed from the one or more other wireless communication devices to the wireless communication device via the wireless communication network.

5. The method of claim 1, wherein the one or more other wireless communication devices comprise or belong to a currently-known set of neighboring wireless communication devices, as known to the wireless communication device via detection of Uplink (UL) signal transmissions by given neighboring wireless communication devices or via Device-to-Device (D2D) discovery operations or via the reception of neighboring-device information from the wireless communication network.

6. The method of claim 5, further comprising transmitting configuration information for the currently-known set of neighboring wireless communication devices directly via D2D signaling or indirectly via OTT signaling, the configuration information indicating a time at which the radar beam sweep will be performed or radio resources to be used for the radar beam sweep.

7. The method of claim 1, wherein receiving the feedback information comprises receiving DL control signaling from the wireless communication network, the DL control signaling based on the one or more other wireless communication devices sending Channel State Information (CSI) reports to the wireless communication network that are based on received-signal measurements made by the one or more other wireless communication devices during the radar beam sweep.

8. The method of claim 1, wherein performing the DL interference mitigation comprises one of avoiding radar transmissions in the interfering radar beam directions or adapting transmission power for radar transmissions in the interfering radar beam directions.

9. The method of claim 1, further comprising, responsive to fulfillment of a triggering condition, updating the determination of whether there are any neighboring wireless communication devices vulnerable to interference from radar transmissions by the wireless communication device, and updating the adaptation of the radar transmissions or transmitting updated assistance information.

10. The method of claim 9, wherein the triggering condition is any one or more of: detecting more than a threshold change in position or orientation of the wireless communication device; receiving information indicating more than a threshold change in position or orientation of any neighboring wireless communication devices; detecting more than a threshold change in one or more conditions of a surrounding physical environment of the wireless communication device that bear on propagation of radar transmissions by the wireless communication device; a change in transmission frequency or bandwidth used by the wireless communication device for radar transmissions; or expiration of an update timer started in relation to a most-recent iteration of determining whether there are any neighboring wireless communication devices vulnerable to interference from radar transmissions by the wireless communication device.

11. A method performed by a radio network node of a wireless communication network, the method comprising:
   receiving feedback from one or more other wireless communication devices neighboring a wireless communication device that communicates with the wireless communication network and performs radar transmissions for surrounding-environment sensing using a same or overlapping millimeter wave (mmW) frequency range, the feedback from each other wireless communication device comprising measurements made by the other wireless communication device on reference signal transmissions by the wireless communication device; and sending Downlink (DL) signaling for the wireless communication device, the DL signaling based on the feedback from the one or more other wireless communication devices and thereby enabling the wireless communication device to determine, for each radar beam direction among a plurality of radar beam directions relative to a current orientation and position of the wireless communication device, whether there are any neighboring wireless communication devices vulnerable to interference from radar transmissions by the wireless communication device with respect to receiving DL communication signals from the wireless communication network.

12. The method of claim 11, wherein receiving the feedback information comprises receiving Channel State Information (CSI) reports from the one or more other wireless communication devices that are based on received-signal measurements made by the one or more other wireless communication devices during a radar beam sweep performed by the wireless communication device.

13. A wireless communication device comprising:
communication circuitry that is configured to communicate with a wireless communication network and perform radar transmissions for surrounding-environment sensing using a same or overlapping millimeter wave (mmW) frequency range; and
processing circuitry that is operatively associated with the communication circuitry and configured to:
determine, for each radar beam direction among a plurality of radar beam directions relative to a current orientation and position of the wireless communication device, whether there are any neighboring wireless communication devices vulnerable to interference from radar transmissions by the wireless communication device with respect to receiving Downlink (DL) communication signals from the wireless communication network and, if so, identifying the radar beam direction as being an interfering radar beam direction; and
responsive to identifying one or more interfering radar beam directions, perform DL interference mitigation by adapting the radar transmissions to account for the one or more interfering radar beam directions or by transmitting assistance information with respect to the one or more interfering radar beam directions to trigger interference suppression or avoidance by the vulnerable neighboring wireless communication devices;
wherein, to determine whether there are any neighboring wireless communication devices vulnerable to interference from radar transmissions by the wireless communication device, the processing circuitry is configured to perform, via the communication circuitry, a radar beam sweep through the plurality of radar beam directions using a defined transmission power, and receive feedback information indicating whether or to what extent the radar transmissions comprised in the radar beam sweep were detected by one or more other wireless communication devices.

14. The wireless communication device of claim 13, wherein the wireless communication network comprises a Radio Access Network (RAN) having a Time Division Duplexing (TDD) configuration that defines alternating phases of operation consisting of a DL phase, wherein the RAN transmits DL signals to given wireless communication devices, and an Uplink (UL) phase, wherein the RAN receives UL signals from given wireless communication devices.

15. The wireless communication device of claim 13, wherein the wireless communication device is configured for operation according to Fifth Generation (5G) network standards released by the Third Generation Partnership Project (3GPP).

16. The wireless communication device of claim 13, wherein, to receive the feedback information, the processing circuitry is configured to receive, via the communication circuitry, the feedback information from the one or more other wireless communication devices directly via Device-to-Device (D2D) signaling or indirectly via Over-The-Top (OTT) signaling conveyed from the one or more other wireless communication devices to the wireless communication device via the wireless communication network.

17. The wireless communication device of claim 13, wherein the one or more other wireless communication devices comprise or belong to a currently-known set of neighboring wireless communication devices, as known to the wireless communication device via detection of Uplink (UL) signal transmissions by given neighboring wireless communication devices or via Device-to-Device (D2D) discovery operations or via the reception of neighboring-device information from the wireless communication network.

18. The wireless communication device of claim 17, wherein the processing circuitry is configured to transmit, via the communication circuitry, configuration information for the currently-known set of neighboring wireless communication devices directly via D2D signaling or indirectly via OTT signaling, the configuration information indicating a time at which the radar beam sweep will be performed or radio resources to be used for the radar beam sweep.

19. The wireless communication device of claim 13, wherein the processing circuitry is configured to receive the feedback information as DL control signaling from the wireless communication network, the DL control signaling based on the one or more other wireless communication devices sending Channel State Information (CSI) reports to the wireless communication network that are based on received-signal measurements made by the one or more other wireless communication devices during the radar beam sweep.

20. A radio network node configured for operation in a wireless communication network, the radio network node comprising:
communication circuitry; and
processing circuitry configured to:
receive, via the communication circuitry, feedback from one or more other wireless communication devices neighboring a wireless communication device that communicates with the wireless communication network and performs radar transmissions for surrounding-environment sensing using a same or overlapping millimeter wave (mmW) frequency range, the feedback from each other wireless communication device comprising measurements made by the other wireless communication device on reference signal transmissions by the wireless communication device; and send, via the communication circuitry, Downlink (DL) signaling for the wireless communication device, the DL signaling based on the feedback from the one or more other wireless communication devices and thereby enabling the wireless communication device to determine, for each radar beam direction among a plurality of radar beam directions relative to a current orientation and position of the wireless communication device, whether there are any neighboring wireless communication devices vulnerable to interference from radar transmissions by the wireless communication device with respect to receiving DL communication signals from the wireless communication network.

21. The radio network node of claim 20, wherein the processing circuitry is configured to receive, as said feedback, Channel State Information (CSI) reports from the one or more other wireless communication devices that are based on received-signal measurements made by the one or more other wireless communication devices during a radar beam sweep performed by the wireless communication device.

\* \* \* \* \*